United States Patent
Yan et al.

(10) Patent No.: US 12,158,737 B2
(45) Date of Patent: Dec. 3, 2024

(54) DEVICE CONTROL PAGE DISPLAY METHOD, RELATED APPARATUS, AND SYSTEM

(71) Applicant: HUAWEI TECHNOLOGIES CO., LTD., Shenzhen (CN)

(72) Inventors: Guoqi Yan, Xi'an (CN); Bo Wang, Shenzhen (CN); Xin Zhao, Xi'an (CN); Shuanqing Dai, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/599,112

(22) PCT Filed: Mar. 26, 2020

(86) PCT No.: PCT/CN2020/081294
§ 371 (c)(1),
(2) Date: Sep. 28, 2021

(87) PCT Pub. No.: WO2020/192714
PCT Pub. Date: Oct. 1, 2020

(65) Prior Publication Data
US 2022/0163932 A1 May 26, 2022

(30) Foreign Application Priority Data
Mar. 28, 2019 (CN) .......................... 201910245789.X

(51) Int. Cl.
*G05B 15/02* (2006.01)
*G06F 3/04817* (2022.01)

(52) U.S. Cl.
CPC ......... *G05B 15/02* (2013.01); *G06F 3/04817* (2013.01)

(58) Field of Classification Search
CPC ... G05B 15/02; G06F 3/04817; G06F 3/0488; G06F 3/04847; Y02B 20/40; G09B 5/065; H04L 12/2816; H05B 47/19
See application file for complete search history.

(56) References Cited

U.S. PATENT DOCUMENTS

2014/0324410 A1* 10/2014 Mathews ................. G09B 9/00
703/22
2015/0074528 A1 3/2015 Sakalowsky et al.
(Continued)

FOREIGN PATENT DOCUMENTS

CN 202306277 U 7/2012
CN 105792316 A 7/2016
(Continued)

OTHER PUBLICATIONS

European Search Report issued in corresponding European Application No. 20778349.9, dated Mar. 17, 2022, pp. 1-10.
(Continued)

*Primary Examiner* — Alicia M. Choi
(74) *Attorney, Agent, or Firm* — HAUPTMAN HAM, LLP

(57) ABSTRACT

A method includes displaying a first user interface, displaying a first simulated operating state of a smart home device in a status display area in response to selecting a first control, receiving an association success notification, displaying a second user interface, and sending a control instruction to the smart home device in response to selecting a second control. The first user interface includes the first control for controlling the smart home device and a status display area of the smart home device. The second user interface includes the second control for controlling the smart home device and the status display area of the smart home device. The control instruction instructs the smart home device to enter a first operating state according to the selecting the second control,
(Continued)

and displaying a second simulated operating state of the smart home device in the status display area of the second user interface.

17 Claims, 23 Drawing Sheets

(56) References Cited

U.S. PATENT DOCUMENTS

| | | |
|---|---|---|
| 2015/0097689 A1 | 4/2015 | Logue et al. |
| 2015/0120015 A1* | 4/2015 | Fadell .................. G05B 15/02 |
| | | 700/90 |
| 2016/0154390 A1* | 6/2016 | Zhang ................ H04L 12/2816 |
| | | 700/275 |
| 2017/0013460 A1* | 1/2017 | Boss ........................ G06F 8/61 |
| 2017/0244574 A1 | 8/2017 | Moon et al. |
| 2017/0359191 A1* | 12/2017 | Smith ................... G05B 15/02 |
| 2018/0011987 A1* | 1/2018 | Zevallos ............... G16H 40/63 |
| 2019/0174606 A1* | 6/2019 | Magielse ............ H05B 47/175 |
| 2020/0133471 A1* | 4/2020 | Sreenivasan ........ G06F 3/04886 |
| 2021/0337064 A1* | 10/2021 | Zhang ................. H04M 1/72466 |
| 2021/0342047 A1* | 11/2021 | Badr ................. H04N 21/43615 |

FOREIGN PATENT DOCUMENTS

| | | | |
|---|---|---|---|
| CN | 106249607 A | 12/2016 | |
| CN | 107705171 A | 2/2018 | |
| CN | 107730008 A | 2/2018 | |
| CN | 108845838 A | 11/2018 | |
| CN | 108920046 A | 11/2018 | |
| CN | 109143884 A | 1/2019 | |
| JP | H07319363 A | 12/1995 | |
| JP | 2004183997 A | 7/2004 | |
| JP | 2014139745 A | 7/2014 | |
| JP | 2016540281 A | 12/2016 | |
| KR | 20160051078 A * | 5/2016 | ............ H04L 12/12 |
| KR | 20170016726 A | 2/2017 | |

OTHER PUBLICATIONS

International Search Report issued in corresponding International Application No. PCT/CN2020/081294, Jun. 30, 2020, pp. 1-11.
Japanese Office Action issued in corresponding Japanese Application No. 2021-552159, dated Dec. 6, 2022, pp. 1-4.

* cited by examiner

DEVICE CONTROL PAGE DISPLAY METHOD, RELATED APPARATUS, AND SYSTEM

This application is a National Stage of International Application No. PCT/CN2020/081294 filed on Mar. 26, 2020, which claims priority to Chinese Patent Application No. 201910245789.X, filed on Mar. 28, 2019, which are incorporated herein by reference in their entireties.

TECHNICAL FIELD

This application relates to the field of smart home technologies, and in particular, to a device control page display method, a related apparatus, and a system.

BACKGROUND

With development of terminal technologies, an increasing quantity of smart home devices enter a user's life. The smart home device is an intelligent device that can implement information exchange and even self-learning through a wireless communication technology and that can provide a convenient and effective service for a user and reduce a workload of the user. The smart home device may include a smart socket, a smart lock, a smart lamp, a smart fan, a smart air conditioner, a smart curtain, and the like.

To manage and operate the smart home device, the user first establishes a dependency relationship with the smart home device. Only a user who has a dependency relationship with a smart home device has permission to access and control the smart home device. Generally, a mobile phone first sends information about an available network to the smart home device, and the smart home device can establish a dependency relationship with the user only after accessing a network by using the information about the available network. A process in which the smart home device accesses the available network may be referred to as a network configuration process. The network configuration process and the process of establishing the dependency relationship between the user and the smart home device are time-consuming to some extent. In the network configuration process and the process of establishing the dependency relationship between the user and the smart home device, the mobile phone presents a waiting picture to the user. The waiting picture is dull and simple, and the user is prone to be irritable when facing the waiting picture. Only after the user successfully establishes the dependency relationship with the smart home device, the mobile phone presents a device control page to the user, and the user can learn of a control method of the smart home device by using the device control page. Before this, the user can only wait, and user experience is poor.

SUMMARY

This application provides a device control page display method, a related apparatus, and a system. Before a user establishes a dependency relationship with a smart home device, an electronic device provides a control page of the smart home device, so that the user can be familiar with a control method of the smart home device and learn of various functions of the smart home device in advance by using the control page.

According to a first aspect, this application provides a device control page display method. The method may include: An electronic device displays a first user interface, where the first user interface includes a first control for controlling a smart home device and a status display area of the smart home device. In response to an operation of selecting the first control, the electronic device displays a simulated operating state of the smart home device in the status display area. The electronic device receives an association success notification, where the association success notification indicates that a binding relationship is successfully established between an associated user of the electronic device and the smart home device. The electronic device displays a second user interface, where the second user interface includes a second control for controlling a smart home device and a status display area of the smart home device. In response to an operation of selecting the second control, the electronic device sends a control instruction to the smart home device, where the control instruction instructs the smart home device to enter a first operating state according to the operation of selecting the second control. The electronic device displays a simulated operating state of the smart home device in the status display area of the second user interface, where the simulated operating state displayed in the status display area of the second user interface corresponds to the first operating state.

According to the method in the first aspect, before the user successfully establishes a dependency relationship with the smart home device, the electronic device provides a control page (that is, the first user interface) of the smart home device, so that the user can be familiar with a control method of the smart home device and learn of various functions of the smart home device in advance by using the control page. This better conforms to user habits and improves user experience.

In the method provided in the first aspect, the first operating state is an actual running state of the smart home device. The first operating state may include: an on/off state of the smart home device in an actual application scenario, a state in which the smart home device runs according to a specific working parameter, and the like. For example, the smart home device is a smart lamp. The first operating state may include but is not limited to: an on state, an off state, a state when a light of a specific brightness is emitted, a state when a light of a specific hue/color is emitted, and the like of the smart lamp in an actual application scenario.

In the method provided in the first aspect, the simulated operating state is a virtual running state displayed by the electronic device on the control page of the smart home device. The simulated operating state may help the user to learn of a state displayed by the smart home device when the smart home device actually runs.

With reference to the method in the first aspect, in some embodiments, the status display area includes a real image of the smart home device that is captured by a camera of the electronic device, or a default image of the smart home device.

When the status display area includes the real image of the smart home device that is captured by the camera of the electronic device, the electronic device may display the simulated operating state on the control page of the smart home device in the following manner: superimposing a simulated effect on the real image of the smart home device for display, where the simulated effect reflects the simulated operating state of the smart home device.

The simulated effect may include: a simulated effect when the smart home device is turned on/off, a simulated effect when the smart home device runs according to a specific working parameter, and the like. For example, the smart home device is a smart lamp. The simulated effect may include but is not limited to: a simulated effect when the smart lamp is turned on, a simulated effect when the smart lamp is turned off, a simulated effect when a light of a specific brightness is emitted, a simulated effect when a light of a specific hue/color is emitted, and the like. Herein, a manner of superimposing the simulated effect on the real image may present an effect similar to augmented reality (augmented reality, AR), thereby improving user experience.

In some embodiments, the control page of the smart home device may be used to set a working state, a working parameter, and the like of the smart home device. The working state of the smart home device may be "on" or "off". Different smart home devices correspond to different working parameters. For example, a working parameter of a smart lamp may include a color and a brightness, a working parameter of a smart speaker may include volume, and a working parameter of an air purifier may include a working mode (such as an automatic mode or a sleep mode) and a wind speed.

Because working parameters corresponding to smart home devices of different categories, manufacturers, or models are different, control pages corresponding to the smart home devices of different categories, manufacturers, or models are also different.

In some embodiments, the electronic device may obtain, by using an index number, a control page corresponding to a currently discovered smart home device. Specifically, before the electronic device displays the first user interface, the method further includes: The electronic device obtains an index number of the smart home device, where the index number of the smart home device is used to indicate one or any combination of a category, a manufacturer, or a model of the smart home device, and the first user interface and the second user interface correspond to the index number of the smart home device.

That is, in the foregoing embodiment, the electronic device may obtain a device control page (including the first user interface and the second user interface) of the smart home device by using the index number of the smart home device.

Herein, a manner in which the electronic device obtains the index number of the smart home device may include:

1. The electronic device scans a message sent by a nearby smart home device, where the message carries the index number of the smart home device. The electronic device may scan the message by using a Bluetooth technology, a Wi-Fi technology, an NFC technology, or the like.

2. The electronic device scans a two-dimensional code provided by a nearby smart home device, where the two-dimensional code indicates the index number of the smart home device. The electronic device may turn on a camera to scan the two-dimensional code.

3. The electronic device receives the index number of the smart home device that is input by the user.

Herein, a manner in which the electronic device obtains the device control page of the smart home device by using the index number of the smart home device may include:

1. The electronic device sends a first request to a cloud server, where the first request carries the index number of the smart home device. The cloud server sends a link address to the electronic device in response to the first request. Correspondingly, the electronic device obtains, from the link address sent by the cloud server, the device control page corresponding to the index number. The device control page corresponding to the index number is the control page of the smart home device.

2. The electronic device sends a second request to a cloud server, where the second request carries the index number of the smart home device. In response to the second request, the cloud server sends the device control page corresponding to the index number to the electronic device. Correspondingly, the electronic device receives the device control page. The device control page is the control page of the smart home device.

3. The electronic device finds, from a plurality of pre-stored device control pages, the device control page corresponding to the index number of the smart home device. The device control page corresponding to the index number is the control page of the smart home device.

4. The electronic device sends a third request to a cloud server, where the third request carries the index number of the smart home device. In response to the third request, the cloud server sends a configuration file corresponding to the index number to the electronic device. Correspondingly, the electronic device receives the configuration file, and generates the device control page of the smart home device based on the configuration file.

With reference to the method in the first aspect, in some embodiments, when the electronic device displays the first user interface, the user has not successfully established a dependency relationship with the smart home device. Therefore, in response to the operation of selecting the first control, the electronic device does not send a control instruction to the smart home device. That is, before the user successfully establishes a dependency relationship with the smart home device, the electronic device cannot control the smart home device.

With reference to the method in the first aspect, in some embodiments, the first control and the second control are used to adjust a working state and/or a working parameter of the smart home device. Specifically, the first control and the second control may be used to monitor an operation (for example, a touch operation) of adjusting the working state and/or the working parameter of the smart home device.

With reference to the method in the first aspect, in some embodiments, after receiving the association success notification, the electronic device may prompt the user that a dependency relationship has been successfully established with the smart home device currently. The electronic device may prompt the user by using the following several methods: 1. The electronic device displays the first user interface and the second user interface in different background colors. In this way, when seeing that the background color of the second user interface changes, the user may learn that the dependency relationship has been successfully established with the smart home device. 2. The electronic device may further prompt the user by displaying prompt information on a status bar, making a prompt tone, vibrating, or blinking an indicator.

With reference to the method in the first aspect, in some embodiments, after the electronic device receives the association success notification, and before the electronic device displays the second user interface, the method further includes: The electronic device displays a third user interface, where the third user interface includes a first application scenario option. In response to a detected operation performed on the first application scenario option, the electronic device sets an application scenario of the smart home device to a first scenario corresponding to the first application scenario option. In this embodiment, the user may set the application scenario of the smart home device on the third user interface. The application scenario of the smart home device may reflect a placement location of the smart home device, for example, a bedroom, a living room, or a kitchen.

With reference to the method in the first aspect, in some embodiments, when the electronic device sends the control instruction to the smart home device in response to the operation of selecting the second control, to control the smart home device to enter the first operating state according to the operation of selecting the second control, the control instruction is forwarded by the cloud server. The process may specifically include:

Step 1: The electronic device sends a control instruction to the cloud server in response to the operation of selecting the second control. The control instruction carries a first identifier of the smart home device, and information used to indicate a working state and a working parameter that correspond to the selection operation. The first identifier may be allocated by the cloud server to the smart home device, and may be used to indicate the smart home device.

Step 2: After receiving the control instruction sent by the electronic device, and determining that an associated user of the electronic device has a dependency relationship with the smart home device, the cloud server sends the control instruction to the smart home device based on the first identifier of the smart home device. The control instruction carries the information used to indicate the working state and the working parameter that correspond the operation of selecting the second control.

Step 3: The smart home device receives the control instruction sent by the cloud server, and enters the first operating state according to the control instruction.

With reference to the method in the first aspect, in some embodiments, the association success notification is specifically used to indicate that an associated user account of the electronic device and a first identifier of the smart home device are successfully associatively stored. In a possible implementation, the association success notification is sent by the cloud server to the electronic device, and the cloud server may successfully associatively store the associated user account of the electronic device with the first identifier of the smart home device.

With reference to the method in the first aspect, a process of establishing a dependency relationship between the associated user of the electronic device and the smart home device is a process of interaction between the electronic device, the smart home device, and the cloud server. This process is time-consuming to some extent, and may specifically include the following steps:

Step 1: The electronic device sends information about an available network to the smart home device. The available network may be a wireless local area network, such as a Wi-Fi network. The information about the available network includes a name of the available network (for example, a service set identifier (SSID) of the Wi-Fi network) and a password of the available network.

Step 2: The smart home device accesses the network.

Step 1 is an optional step. For example, the smart home device may further access a network by scanning a two-dimensional code to obtain information about an available network, receive information about an available network that is input by the user, or the like. In some embodiments, the smart home device may further access a network by using a configured mobile communications module.

Step 3: The electronic device requests to register with the smart home device.

Step 4: In response to the request, the cloud server provides configuration information of the smart home device for the electronic device. The configuration information may include a first identifier of the smart home device.

Step 5: The electronic device sends the configuration information (for example, the first identifier and/or a registration code of the smart home device) to the smart home device.

Step 6: The smart home device initiates registration with the cloud server.

Step 7: The electronic device sends a fourth request to the cloud server, where the fourth request is used to request to bind to the smart home device. The fourth request may carry the first identifier of the smart home device.

Step 8: In response to the fourth request, the cloud server associatively stores or binds the first identifier of the smart home device with an associated user account of the electronic device, that is, establishes a dependency relationship between an associated user of the electronic device and the smart home device.

Step 9: The cloud server sends an association success notification to the electronic device.

According to a second aspect, an embodiment of this application provides an electronic device. The electronic device includes one or more processors, a memory, and a display. The memory is coupled to the one or more processors, the memory is configured to store computer program code, the computer program code includes computer instructions, and the one or more processors invoke the computer instructions, so that the electronic device performs the following operations:

displaying a first user interface on the display, where the first user interface includes a first control for controlling a smart home device and a status display area of the smart home device;

in response to an operation of selecting the first control, displaying a simulated operating state of the smart home device in the status display area;

receiving an association success notification, where the association success notification indicates that a binding relationship is successfully established between an associated user of the electronic device and the smart home device;

displaying a second user interface on the display, where the second user interface includes a second control for controlling a smart home device and a status display area of the smart home device; and in response to an operation of selecting the second control, sending a control instruction to the smart home device, where the control instruction instructs the smart home device to enter a first operating state according to the operation of selecting the second control; and displaying a simulated operating state of the smart home device in the status display area of the second user interface, where the simulated operating state displayed in the status display area of the second user interface corresponds to the first operating state.

According to the electronic device in the second aspect, before the user successfully establishes a dependency relationship with the smart home device, the electronic device provides a control page (that is, the first user interface) of the smart home device, so that the user can be familiar with a control method of the smart home device and learn of various functions of the smart home device in advance by using the control page. This better conforms to user habits and improves user experience.

With reference to the electronic device in the second aspect, for the first operating state, refer to related descriptions in the first aspect. For the simulated operating state, refer to related descriptions in the first aspect.

With reference to the electronic device in the second aspect, in some embodiments, the status display area includes a real image of the smart home device that is captured by a camera of the electronic device, or a default image of the smart home device.

When the status display area includes the real image of the smart home device that is captured by the camera of the electronic device, the electronic device may display the simulated operating state on the control page of the smart home device in the following manner: superimposing a simulated effect on the real image of the smart home device for display, where the simulated effect reflects the simulated operating state of the smart home device. For the simulated effect, refer to related descriptions in the first aspect.

With reference to the electronic device in the second aspect, the first user interface and the second user interface are control pages of the smart home device, and the control page may be used to set a working state, a working parameter, and the like of the smart home device. For the working state and the working parameter of the smart home device, refer to related descriptions in the first aspect.

With reference to the electronic device in the second aspect, in some embodiments, the electronic device may obtain, by using an index number, a control page corresponding to a currently discovered smart home device. Specifically, the one or more processors are further configured to invoke the computer instructions, so that the electronic device performs the following operation: before displaying the first user interface on the display, obtaining an index number of the smart home device, where the index number of the smart home device is used to indicate one or any combination of a category, a manufacturer, or a model of the smart home device, and the first user interface and the second user interface correspond to the index number of the smart home device.

Herein, for a manner in which the electronic device obtains the index number of the smart home device, refer to related descriptions in the first aspect.

Herein, for a manner in which the electronic device obtains the device control page of the smart home device by using the index number of the smart home device, refer to related descriptions in the first aspect.

With reference to the electronic device in the second aspect, in some embodiments, when the electronic device displays the first user interface, the user has not successfully established a dependency relationship with the smart home device. Therefore, the one or more processors are further configured to invoke the computer instructions, so that the electronic device performs the following operation: in response to the operation of selecting the first control, skipping sending a control instruction to the smart home device.

With reference to the electronic device in the second aspect, in some embodiments, the first control and the second control are used to adjust a working state and/or a working parameter of the smart home device. Specifically, the first control and the second control may be used to monitor an operation (for example, a touch operation) of adjusting the working state and/or the working parameter of the smart home device.

With reference to the electronic device in the second aspect, in some embodiments, after receiving the association success notification, the electronic device may prompt the user that a dependency relationship has been successfully established with the smart home device currently. Specifically, the one or more processors are further configured to invoke the computer instructions, so that the electronic device performs the following operation: prompting the user that the dependency relationship has been successfully established with the smart home device currently. For a prompt manner, refer to related descriptions in the first aspect. For example, the first user interface and the second user interface may be displayed in different background colors.

With reference to the electronic device in the second aspect, in some embodiments, the one or more processors are further configured to invoke the computer instructions, so that the electronic device performs the following operations: after receiving the association success notification, and before displaying the second user interface, displaying a third user interface, where the third user interface includes a first application scenario option; and in response to a detected operation performed on the first application scenario option, setting an application scenario of the smart home device to a first scenario corresponding to the first application scenario option. In this embodiment, the user may set the application scenario of the smart home device on the third user interface. The application scenario of the smart home device may reflect a placement location of the smart home device, for example, a bedroom, a living room, or a kitchen.

With reference to the electronic device in the second aspect, in some embodiments, when the electronic device sends the control instruction to the smart home device in response to the operation of selecting the second control, to control the smart home device to enter the first operating state according to the operation of selecting the second control, the control instruction is forwarded by the cloud server. For the process, refer to related descriptions in the first aspect.

With reference to the electronic device in the second aspect, in some embodiments, the association success notification received by the electronic device is specifically used to indicate that an associated user account of the electronic device and a first identifier of the smart home device are successfully associatively stored. In a possible implementation, the association success notification is sent by the cloud server to the electronic device, and the cloud server may successfully associatively store the associated user account of the electronic device with the first identifier of the smart home device.

With reference to the electronic device in the second aspect, a process of establishing a dependency relationship between the associated user of the electronic device and the smart home device is a process of interaction between the electronic device, the smart home device, and the cloud server. The process is time-consuming to some extent. For details, refer to related descriptions in the first aspect.

According to a third aspect, an embodiment of this application provides a smart home device management system. The smart home device management system includes an electronic device and a smart home device. The electronic device is the electronic device in any one of the second aspect or the implementations of the second aspect, and the smart home device is configured to: receive a control instruction sent by the electronic device, and enter a first operating state according to the control instruction.

According to a fourth aspect, an embodiment of this application provides a computer program product including instructions. When the computer program product is run on an electronic device, the electronic device is enabled to perform the method in any one of the first aspect or the possible implementations of the first aspect.

According to a fifth aspect, this application provides a computer-readable storage medium including instructions. When the instructions are run on an electronic device, the electronic device is enabled to perform the method in any one of the first aspect or the possible implementations of the first aspect.

According to the technical solutions provided in this application, before a dependency relationship is successfully established between the user and the smart home device, the electronic device provides the control page of the smart home device, so that the user can be familiar with a control method of the smart home device and learn of various functions of the smart home device in advance by using the control page. This better conforms to user habits and improves user experience.

BRIEF DESCRIPTION OF DRAWINGS

To describe technical solutions in embodiments of this application or in the background more clearly, the following describes accompanying drawings used in describing the embodiments of the present disclosure or the background.

DESCRIPTION OF EMBODIMENTS

The following describes the technical solutions in the embodiments of this application with reference to the accompanying drawings in the embodiments of this application.

In descriptions of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

The following terms "first" and "second" are merely intended for a purpose of descriptions, and shall not be understood as an indication or implication of relative importance or implicit indication of a quantity of indicated technical features. Therefore, a feature limited by "first" or "second" may explicitly or implicitly include one or more features. In the description of the embodiments of this application, unless otherwise specified, "a plurality of" means two or more than two.

The embodiments of this application provide a device control page display method. After discovering a nearby smart home device, an electronic device may provide a control page of the smart home device for a user. In other words, the user may view the control page of the smart home device that is provided by the electronic device without waiting for a dependency relationship to be successfully established with the smart home device. The user can be familiar with a control method of the smart home device and learn of various functions of the smart home device in advance by using the control page. This better conforms to user habits and improves user experience.

Figure 1:
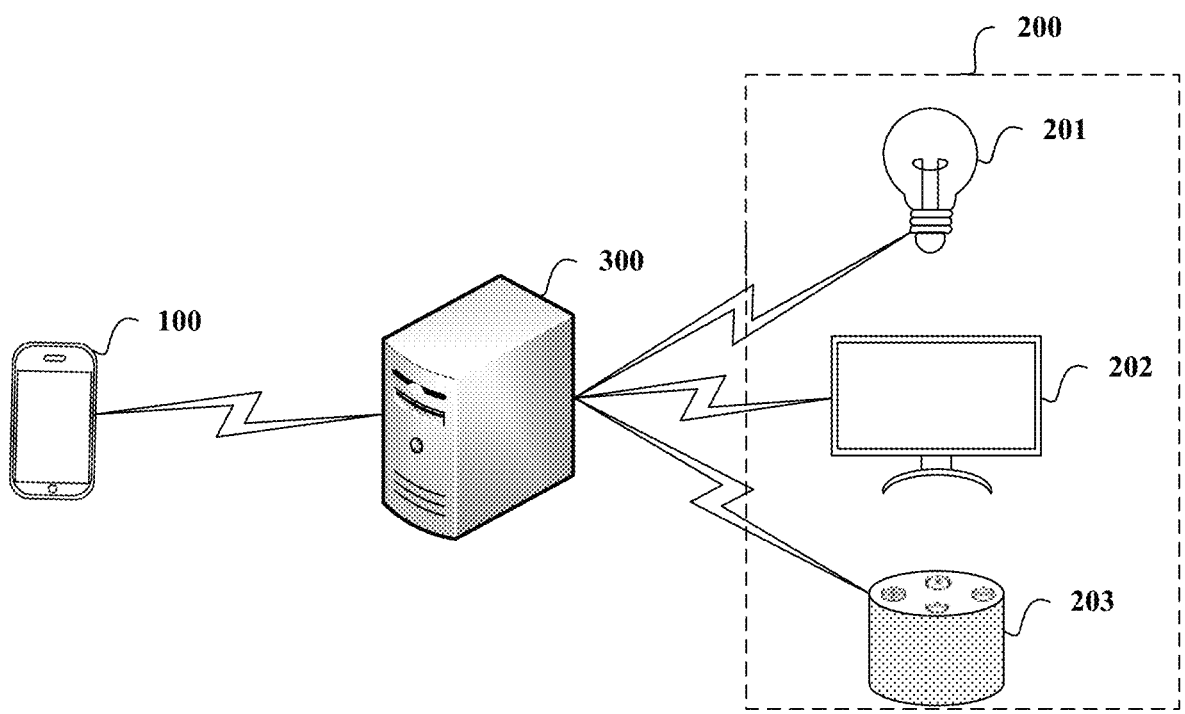
FIG. 1 is a schematic structural diagram of a smart home device management system according to at least an embodiment of the present disclosure.

A smart home device management system in the embodiments of this application is first described. FIG. 1 is a schematic structural diagram of a smart home device management system according to an embodiment of this application. As shown in FIG. 1, the smart home device management system may include an electronic device 100, one or more smart home devices 200, and a cloud server 300.

The electronic device 100 may be a portable electronic device, for example, a mobile phone, a tablet computer, a personal digital assistant (personal digital assistant, PDA), or a wearable device. An example embodiment of the portable electronic device includes but is not limited to a portable electronic device using iOS, Android, Microsoft, or another operating system. The portable electronic device may alternatively be another portable electronic device, for example, a laptop (laptop) with a touch-sensitive surface (for example, a touch panel). It should be further understood that, in some embodiments of this application, the electronic device 100 may alternatively be a desktop computer with a touch-sensitive surface (for example, a touch panel) instead of a portable electronic device.

An application (APP) used to manage a smart home device may be installed on the electronic device 100, or the electronic device 100 may access a world wide web (world wide web, web) page used to manage a smart home device. An application or a web page used to manage a smart home device may be developed and provided by a manufacturer of the smart home device (for example, a manufacturer of a smart router (for example, Huawei)).

The electronic device 100 may control, by using the application or the web page used to manage the smart home device, a smart home device that has a dependency relationship with an associated user of the electronic device 100. The associated user of the electronic device is a user corresponding to a user account for logging in to the application or the web page on the electronic device 100. For example, a user 1 uses a user account (for example, a Huawei account) of the user 1 to log in to the application or the web page used to manage the smart home device. In this case, the user 1 is an associated user of the electronic device 100. A user account for logging in to the application or the web page that is on the electronic device 100 and that is used to manage the smart home device may be referred to as an associated user account of the electronic device 100. A user account is usually uniquely identified by an email address or a mobile phone number of a user, and may also be named by using another account (for example, a social networking site account).

That a user has a dependency relationship with a smart home device means that a device identifier of the smart home device is bound to or associated with a user account of the user. The device identifier of the smart home device may uniquely indicate the smart home device, for example, may be a media access control (MAC) address or another unique identifier. A main purpose of establishing the dependency relationship between the user and the smart home device is to confirm that the user holds the smart home device, and only the user having the dependency relationship with the smart home device has permission to access and control the smart home device. It may be understood that the dependency relationship between the user and the smart home may also be referred to as an association relationship, a binding relationship, or another name, and is not limited in one or more embodiments of the present disclosure.

The electronic device 100 may be connected to the cloud server 300 over a wireless network, and manage the smart home device 200 through the cloud server 300. The wireless network may be a cellular data network, a wireless local area network (WLAN) (for example, a wireless fidelity (Wi-Fi) network), or the like. Herein, the cellular data network may include but is not limited to the following: 1. Cellular network constructed based on any one of the following wireless communications technologies: a second-generation mobile communications technology (2G) (for example, a general packet radio service (GPRS)), a third-generation mobile communications technology (3G) (for example, code division multiple access (CDMA), wideband code division multiple access (WCDMA), or time-division code division multiple access (TD-SCDMA)), a fourth-generation mobile communications technology (4G) (for example, long term evolution (long term evolution, (LTE)), a fifth-generation mobile communications technology (5G), a communications technology proposed in a subsequent development process, and the like. 2. Narrowband internet of things (NB-IoT). The NB-IoT is constructed based on a cellular network, and can meet a requirement of an internet of things terminal device for low power consumption and low costs.

The smart home device is an intelligent device that can implement information exchange and even self-learning through a wireless communication technology and that can provide a convenient and effective service for a user and reduce a workload of the user. The smart home device 200 may include a smart socket, a smart lock, a smart lamp, a smart fan, a smart air conditioner, a smart curtain, a smart TV, a smart rice cooker, a smart router, and the like. For example, as shown in FIG. 1, the smart home device 200 may include a smart lamp 201, a smart TV 202, and a smart speaker 203. The smart lamp 201 may control a change of a light, for example, a change of a color and a brightness of the light. The smart TV 202 may perform voice interaction with the user, for example, may receive a voice control instruction from the user to play a TV program that the user likes. The smart speaker 203 may perform voice interaction with the user, for example, may receive a voice control instruction from the user to play a song that the user likes. In some implementations, the smart speaker 203 may have an integrated voice assistant module, and may provide an interactive voice conversation or query function by using a "wake-up word" (for example, "Hello, Xiaoyi").

The smart home device 200 is provided with a wireless communications module. The wireless communications module may provide wireless communications solutions that are applied to the smart home device 200 and that include one or more of a wireless local area network (WLAN) (for example, a wireless fidelity (Wi-Fi) network), Bluetooth (BT), near field communication (NFC), infrared (IR), and the like. In some embodiments, the smart home device 200 may alternatively be provided with a mobile communications module. The mobile communications module may provide a solution that is applied to the electronic device 100 and that includes a wireless communications technology such as 2G/3G/4G/5G.

The smart home device 200 may communicate with the electronic device 100 by using a wireless communications technology. Specifically, the smart home device 200 may send a wireless signal through the wireless communications module, so that the electronic device 100 discovers the smart home device 200. The smart home device 200 may further access a network through the wireless communications module or a mobile communications module, and further communicate with the cloud server 300, to receive an instruction from the cloud server 300 and enable/disable various functions according to the instruction, or report a working state and a working parameter of the smart home device 200 to the cloud server 300.

The cloud server 300 is a device that provides a secure and reliable elastic computing service, and can be used as a media platform to implement communication between a home internal control device and an external control device, so as to meet requirements of remote control, detection, and information exchange. It may be understood that the cloud server 300 may include one or more servers. For example, the cloud server 300 may be a server cluster, and different servers may be configured to provide different services. The cloud server 300 is associated with a manufacturer or service provider of the smart home device 200. For example, the cloud server 300 may automatically send a software update to the smart home device 200 or provide a cloud service for the smart home device 200. In some embodiments, the cloud server 300 provides an interface of an application or a web page used to manage a smart home device. The cloud server 300 may receive, through the interface, an instruction that is sent by the electronic device 100 and that is used to manage a smart home device, and send an instruction to a corresponding smart home device based on the instruction, to manage the smart home device. For example, the cloud server 300 may instruct, according to the instruction sent by the electronic device 100, to turn on/off the smart lamp 201 and adjust a brightness or a color temperature.

Figure 2:
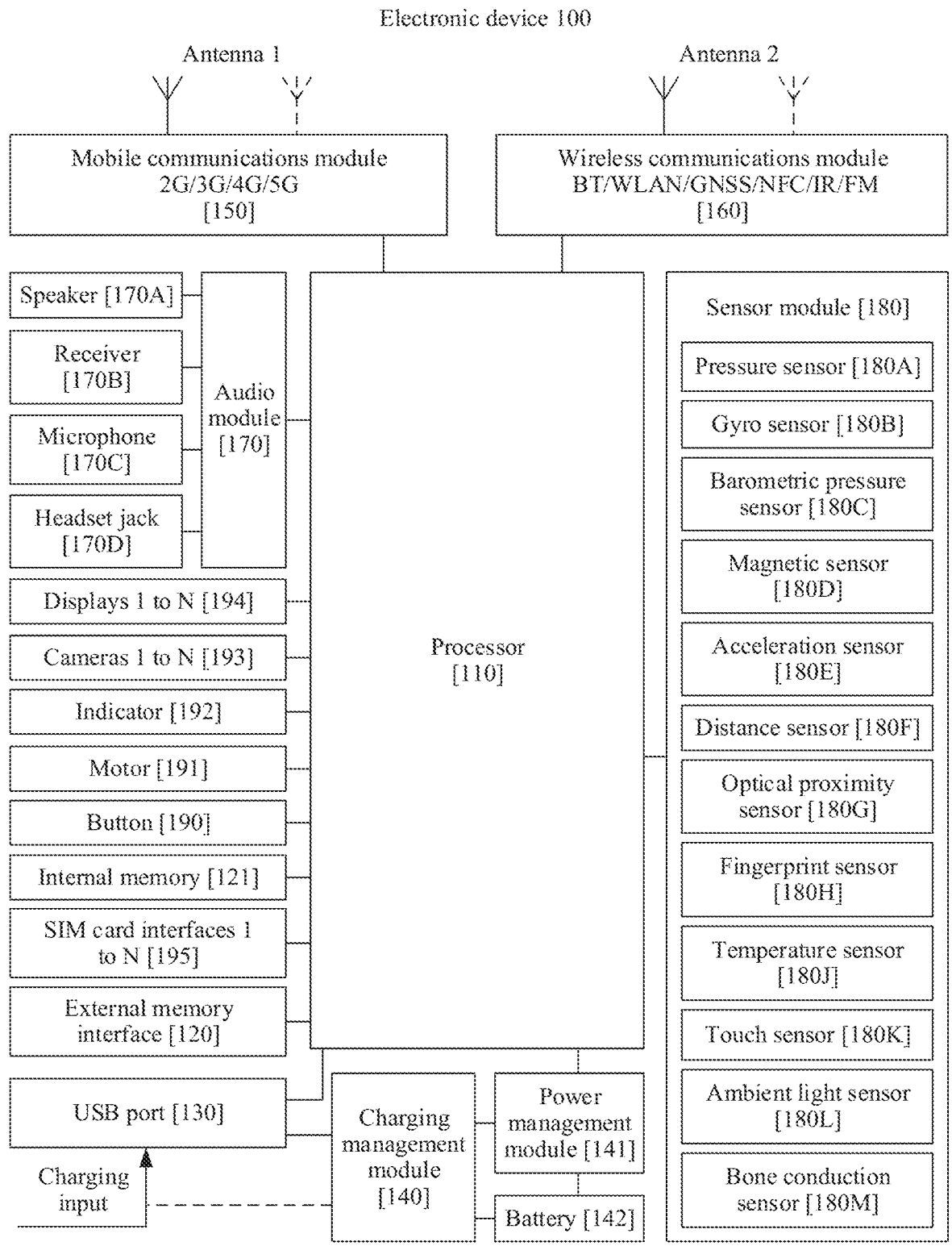
FIG. 2 is a schematic structural diagram of an electronic device according to at least an embodiment of the present disclosure.

The following describes a structure of the electronic device 100 in the embodiments of this application. FIG. 2 is a schematic structural diagram of the electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in one or more embodiments of present disclosure does not constitute a specific limitation on the electronic device 100. In some embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on instruction operation code and a time sequence signal, to control instruction fetching and instruction execution.

The memory may be further disposed in the processor 110, and is configured to store an instruction and data. In some embodiments, the memory in the processor 110 is a cache. The memory may store an instruction or data that is used or cyclically used by the processor 110. If the processor 110 uses the instruction or the data again, the instruction or the data may be invoked directly from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be configured to connect to the charger to charge the electronic device 100, may be configured to transmit data between the electronic device 100 and a peripheral device, or may be configured to connect to a headset to play audio by using the headset. Alternatively, the port may be configured to connect to another electronic device, for example, an AR device.

It may be understood that an interface connection relationship between modules illustrated in one or more embodiments of the present disclosure is merely an example for description, and does not constitute a limitation on the structure of the electronic device 100. In some embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive wireless charging input through a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives input of the battery 142 and/or input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some embodiments, the power management module 141 may alternatively be disposed in the processor 110. In some embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some embodiments, the antenna may be used in combination with a tuning switch.

The mobile communications module 150 can provide a solution, applied to the electronic device 100, to a wireless communication technology including 2G/3G/4G/5G, and the like. The mobile communications module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and transmit the received electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules of the mobile communication module 150 and at least some modules of the processor 110 may be disposed in a same device. In some embodiments, the electronic device 100 may communicate with the cloud server 300 through the mobile communications module 150, and control the smart home device 200 through the cloud server 300. For example, the electronic device 100 may send an instruction to the cloud server 300, and the cloud server 300 instructs, according to the instruction, the smart home device 200 to change a working state and a working parameter.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal by using an audio device (which is not limited to the speaker 170A, the receiver 170B, or the like), or displays an image or a video through the display 194. In some embodiments, the modem processor may be an independent device. In some embodiments, the modem processor may be independent of the processor 110, and disposed in a same device with the mobile communication module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more components integrating at least one communication processing module. The wireless communications module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave by using the antenna 2 for radiation. In some embodiments, the electronic device 100 may discover a nearby smart home device 200 through the wireless communications module 160. In some embodiments, the electronic device 100 may further send, to the smart home device 200 through the wireless communications module 160, a device identifier allocated by the cloud server 300 to the smart home device 200, or receive, through the wireless communications module 160, a device identifier that is sent by the smart home device 200 and that is allocated by the cloud server 300 to the smart home device 200.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode or active-matrix organic light emitting diode (AMOLED), a flexible light-emitting diode (FLED), a Miniled, a MicroLed, a Micro-oLed, quantum dot light emitting diodes (QLED), or the like. In some embodiments, the electronic device 100 may include one or N displays 194, where N is a positive integer greater than 1. In some embodiments, the display 194 is configured to display a control page of the smart home device 200. Before an associated user of the electronic device 100 establishes a dependency relationship with the smart home device 200, the user cannot control the smart home device 200 by using the control page. After the associated user of the electronic device 100 establishes the dependency relationship with the smart home device 200, the user may control the smart home device 200 by using the control page.

The electronic device 100 can implement a photographing function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1. In some embodiments of this application, the camera 193 may be configured to collect an image of the smart home device 200. In some embodiments of this application, the camera may be configured to scan a two-dimensional code provided by the smart home device 200. The two-dimensional code is used to indicate an identifier and an index number of the smart home device 200. For details, refer to the following embodiments.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications of the electronic device 100 and data processing.

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an electrical audio signal into a sound signal. The electronic device 100 may be configured to listen to music or answer a hands-free call by using the speaker 170A.

The receiver 170B, also referred to as an "earpiece", is configured to convert an electrical audio signal into a sound signal. When a call is answered or speech information is received by using the electronic device 100, the receiver 170B may be put close to a human ear to receive a speech.

The microphone 170C, also referred to as a "mike" or a "microphone", is configured to convert a sound signal into an electrical signal. When making a call or sending speech information, the user may make a sound by moving a human mouth close to the microphone 170C to input a sound signal to the microphone 170C. At least one microphone 170C may be disposed in the electronic device 100. In some embodiments, two microphones 170C may be disposed in the electronic device 100, to implement a noise reduction function, in addition to collecting a sound signal. In some embodiments, three, four, or more microphones 170C may alternatively be disposed in the electronic device 100, to collect a sound signal, reduce noise, identify a sound source, implement a directional recording function, and the like.

The headset jack 170D is configured to connect to a wired headset. The headset jack 170D may be the USB port 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an application icon "SMS message", an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, obtains, through calculation based on the angle, a distance for which a lens module compensates, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, so that the electronic device 100 automatically turns off a screen to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some embodiments, when the temperature is less than another threshold, the electronic device 100 heats the battery 142 to prevent the electronic device 100 from being shut down abnormally due to a low temperature. In some embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided by the display 194. In some embodiments, the touch sensor 180K may alternatively be disposed on a surface of the electronic device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive key input, and generate key signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 can support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 3:
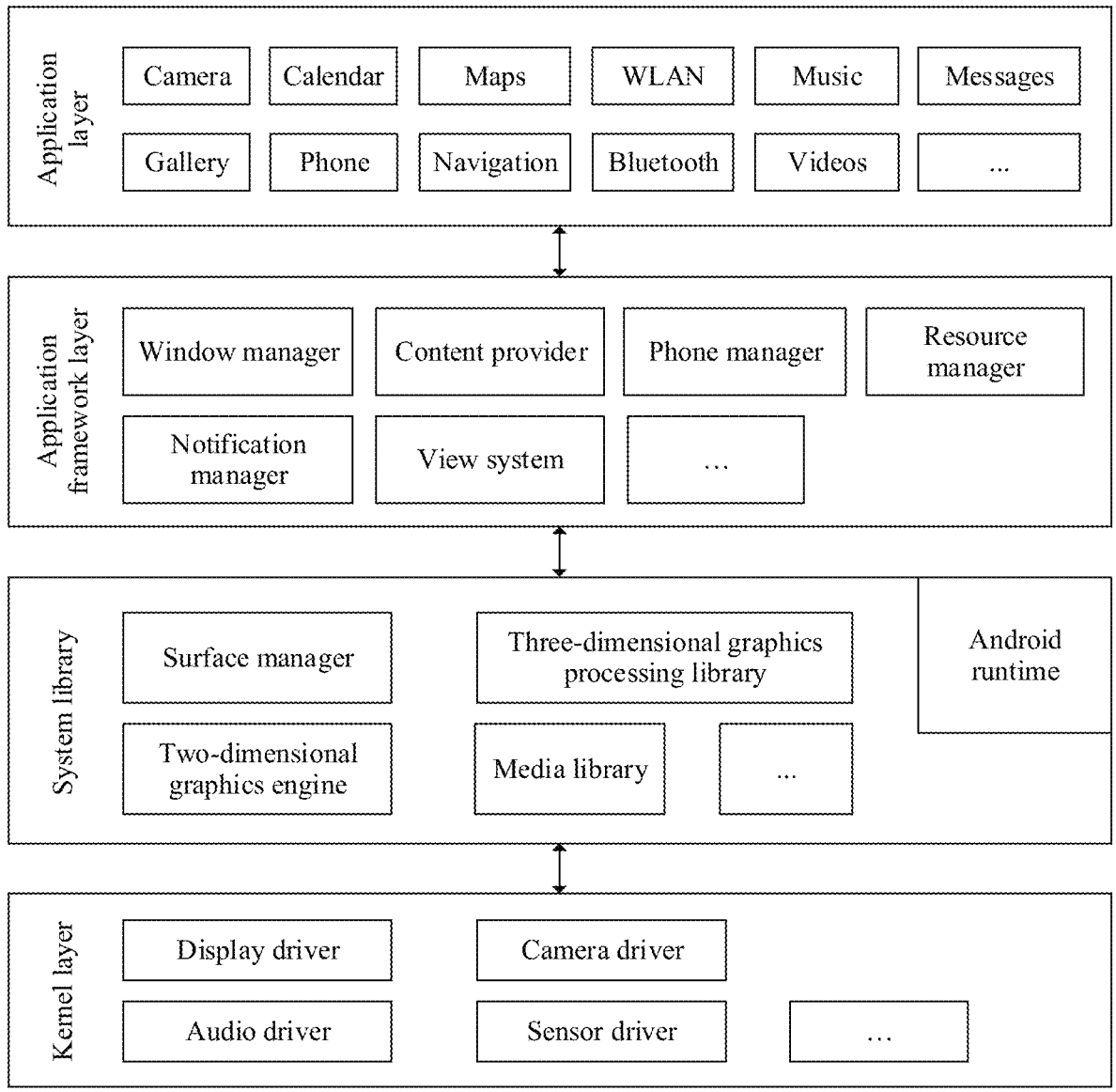
FIG. 3 is a block diagram of a software structure of an electronic device according to at least an embodiment of the present disclosure.

FIG. 3 is a block diagram of the software structure of the electronic device 100, in accodance with some embodiments.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Video, and Messages. In some embodiments, the application package includes an application used to manage a smart home device. An application used to manage a smart home device may be developed and provided by a manufacturer of the smart home device (for example, a manufacturer of a smart router (for example, Huawei)).

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application.

The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages, and may include a text display view and a picture display view.

The phone manager is configured to provide a communication function of the electronic device 100, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted for in the status bar, an announcement is produced, the electronic device vibrates, or the indicator light blinks.

The Android runtime includes a kernel library and a virtual machine. The Android runtime is responsible for scheduling and management of the Android system.

The kernel library includes two parts: a function that is invoked in Java language, and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. The camera application invokes an interface at the application framework layer to enable the camera application, then enables a camera driver by invoking the kernel layer, and captures a static image or a video through the camera 193.

The following describes some human-computer interaction embodiments provided in the embodiments of this application.

In some embodiments, the user may use a user account and a password of the user to log in to an application or a web page that is installed on the electronic device 100 and that is used to manage a smart home device. For example, FIG. 4a shows a user interface 10 provided by the electronic device 100 after a user uses a user account and a password to log in to an application used to manage a smart home device.

Figure 4A:
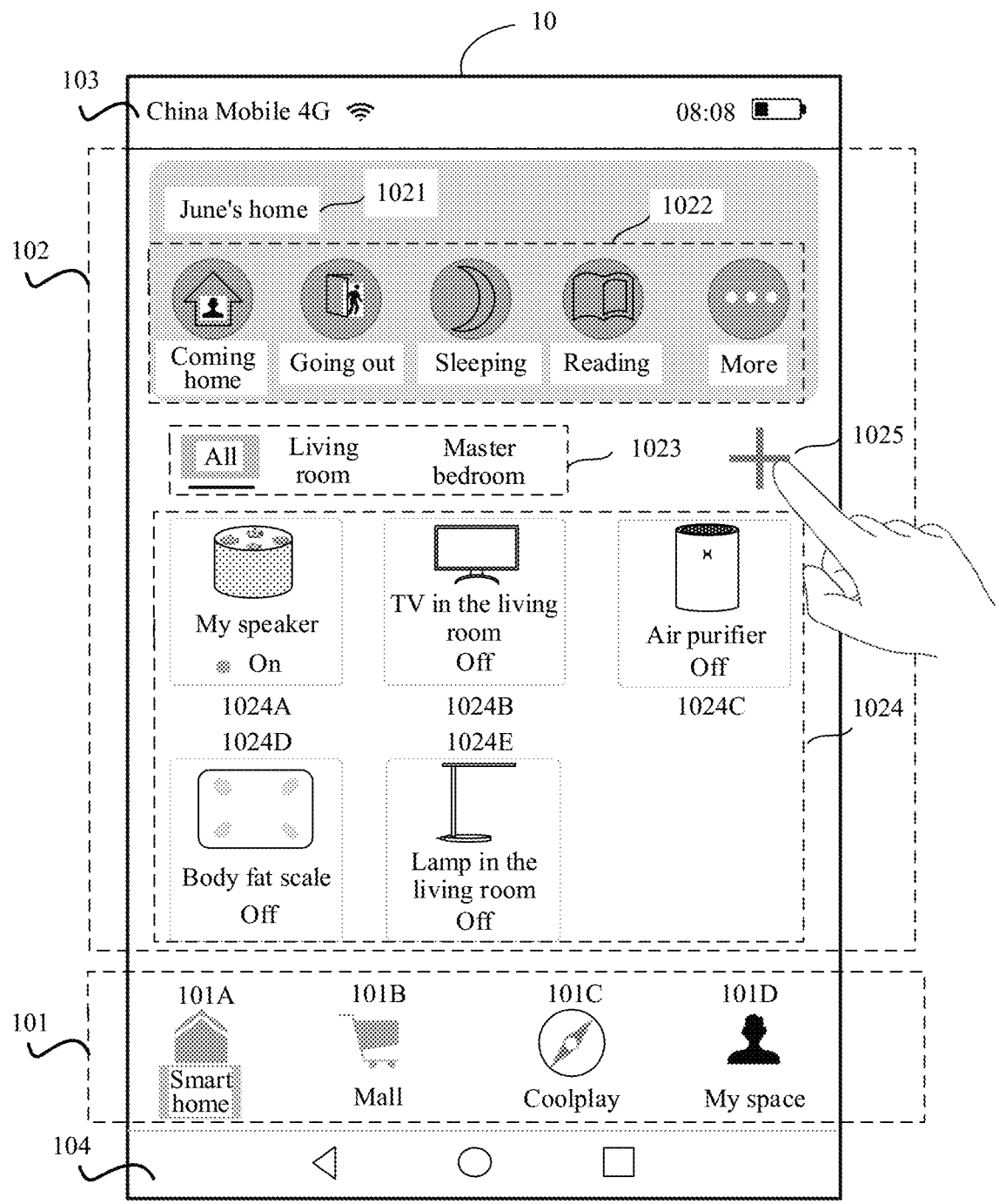
FIG. 4a to FIG. 4e and FIG. 5 are schematic diagrams of human-computer interaction occurring when a smart home device is added according to at least an embodiment of the present disclosure.

As shown in FIG. 4a, the user interface 10 may include a menu 101 and a content display area 102. In some embodiments, the user interface 10 may further include a status bar 103, and the status bar 103 may include one or more of the following: a name of an operator (for example, China Mobile), a Wi-Fi icon, a signal strength, a time, a battery icon, an alarm clock icon (not shown in the figure), a Bluetooth icon (not shown in the figure), and the like. In some embodiments, the user interface 10 may further include a collapsible navigation bar 104, and the navigation bar 104 may include a return button, a home screen button, and a multitask button. In the user interface 10, the menu 101 may include a plurality of controls, for example, "Smart home" 101A, "Mall" 101B, "Coolplay" 101C, and "My space" 101D shown in FIG. 4a.

The plurality of controls may be represented in a form of text (for example, "Smart home", "Mall", "Coolplay", and "My space" in the user interface 10) and/or in a form of an icon (for example, icons in the menu 101 in the user interface 10).

Content displayed in the content display area 102 is related to a currently selected control in the menu 101, that is, different controls in the menu 101 correspond to different content displayed in the content display area 102. If the currently selected control is "Mall" 101B, the content display area 102 displays content used to purchase a smart home device. If the currently selected control is "Coolplay" 101C, the content display area 102 displays related information that is about the smart home device and that is shared by another user. If the currently selected control is "My space" 101D, the content display area 102 displays content used to set information such as a user account.

As shown in FIG. 4a, "Smart home" 101A in the current menu 101 is selected, and the content display area 102 displays content used to manage a smart home device that has a dependency relationship with the user. The content display area 102 may include a user name indicator 1021, a scenario list 1022, a smart home device category list 1023, a smart home device list 1024, and a control 1025.

The user name indicator 1021 is used to indicate a user (that is, an associated user of the electronic device 100) corresponding to a user account that is for currently logging in to the electronic device 100 and that is of an application used to manage the smart home device. For example, a user name indicator "June's home" shown in FIG. 4*a* indicates that a user's name is "June".

The scenario list 1022 includes one or more scenario icons and names. For example, four scenarios are shown in FIG. 4*a*: "Coming home", "Going out", "Sleeping", and "Reading". The user may preset a smart home device that is turned on in each scenario and a working parameter of the smart home device. For example, the user may set a working state of a smart speaker to "off" in the scenario "Going out", and set the working state of the smart speaker to "on" and set volume of the smart speaker to 20 in the scenario "Coming home". After the setting is completed, the user may tap a scenario icon in the scenario list 1022, to turn on one or more smart home devices in a scenario corresponding to the scenario icon, and indicate the smart home device to run according to a preset working parameter. Different smart home devices correspond to different working parameters. For example, a working parameter of a smart lamp may include a color and a brightness, a working parameter of a smart speaker may include volume, and a working parameter of an air purifier may include a working mode and a wind speed. The scenario list 1022 may further include an icon "More". The user may tap the icon "More". In response to the tap operation, the electronic device 100 may display an interface used to add a scenario, set a smart home device in the added scenario, and set a working parameter of the smart home device. After the user adds a new scenario by using the interface, an icon and a name of the new scenario may be added to the scenario list 1022.

The smart home device category list 1023 may include one or more category options, and the category option may enable a smart home device category having a dependency relationship with the user to be displayed in the smart home device list 1024. As shown in 4*a*, the category list 1023 may include three category options: "All", "Living room", and "Master bedroom". The category option in the category list 1023 may be set by the user. "All", "Living room", and "Master bedroom" included in the category list 1023 constitute no limitation. A first user may further set another category option, and one or more embodiments of the present disclosure is merely an example for description, and constitutes no limitation.

Content displayed in the smart home device list 1024 is related to a currently selected option in the category list 1023, that is, different options in the category list 1023 correspond to different content displayed in the smart home device list 1024. When the option "All" is selected, the smart home device list 5054 displays display information of all smart home devices that have a dependency relationship with the user. When the option "Living room" is selected, the smart home device list 5054 displays display information of a smart home device that is located in the living room and that is in all the smart home devices that have the dependency relationship with the user. When the option "Master bedroom" is selected, the smart home device list 5054 displays display information of a smart home device that is located in the master bedroom and that is in all the smart home devices that have the dependency relationship with the user.

As shown in FIG. 4*a*, when the option "All" in the category list 1023 is currently selected, the smart home device list 1024 displays display information of all smart home devices that have a dependency relationship with the user. The display information of the smart home device may include a picture, a name, and a working state of the smart home device. The name of the smart home device may be set by a user, or may be a default name of the smart home device. The working state of the smart home device may be "on" or "off". As shown in FIG. 4*a*, the smart home device list 1024 may include display information 1024A of a speaker, display information 1024B of a TV, display information 1024C of an air purifier, display information 1024D of a body fat scale, display information 1024E of a table lamp, and the like.

The display information in the smart home device list 1024 may be used to display a control page of the smart home device. The control page may be used to set a working state and a working parameter of the smart home device, or may be used to check a working state and a working parameter of the smart home device, and the like. For example, the user may tap a picture of the speaker in the display information 1024A, and in response to the tap operation, the electronic device 100 displays a user interface that can be used to turn on/off the speaker and set a working parameter of the speaker.

The control 1025 may be used to add a device or a scenario. The control 1025 may be used to receive an input user operation (for example, a tap operation), and in response to the user operation, the electronic device 100 may display, in the user interface 10, a small window for adding a device. For the small window for adding a device, refer to related descriptions in the embodiment in FIG. 4*b*.

It may be understood that, not limited to FIG. 4*a*, after the user uses the user account and the password to log in to the application used to manage the smart home device, a page layout of the user interface provided by the electronic device 100 may alternatively be presented in another form. This is not limited in this embodiment.

Figure 4B:
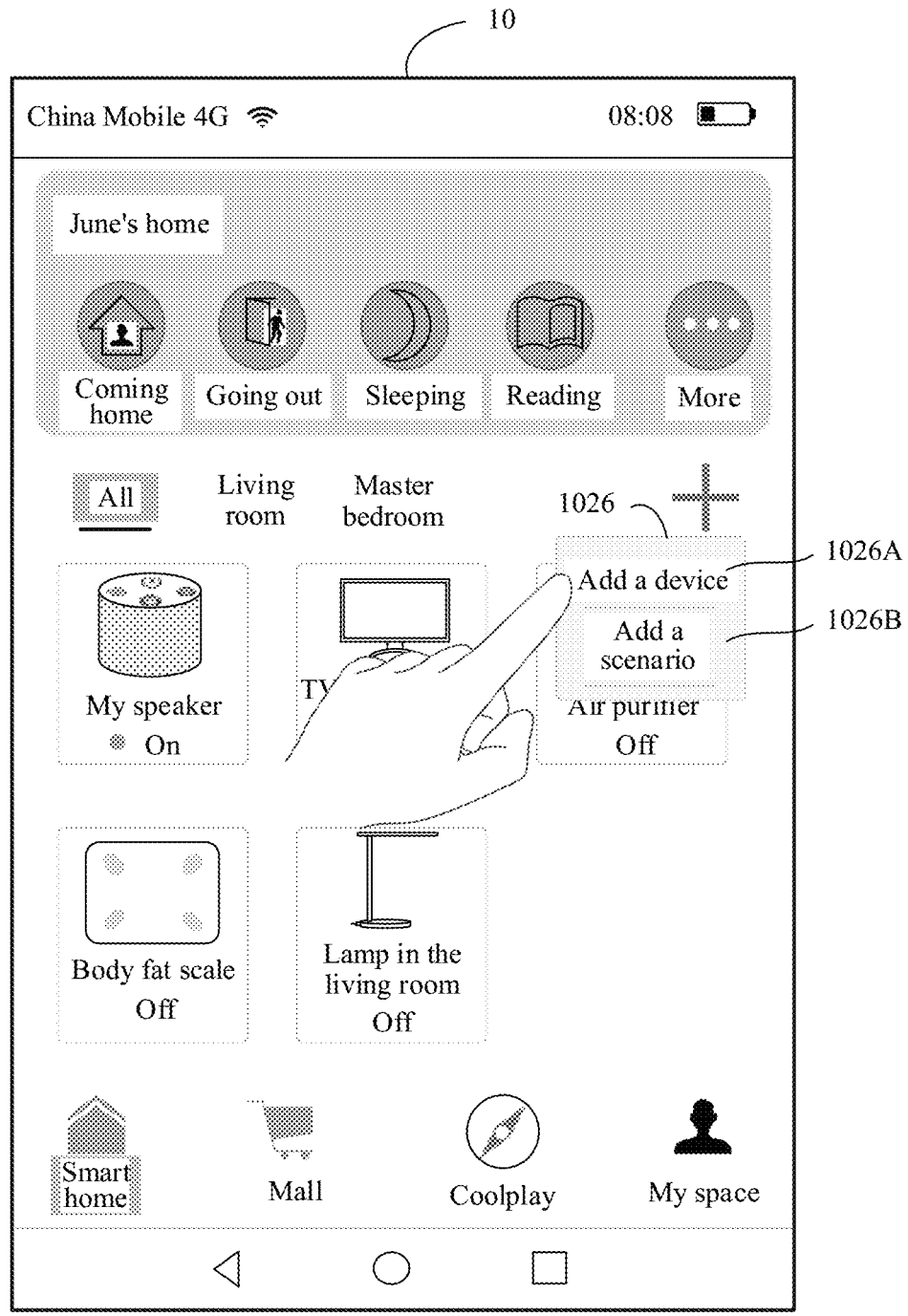

FIG. 4*b* shows a possible small window 1026 for adding a device.

As shown in FIG. 4*b*, the small window 1026 may include a control 1026A for adding a device. The control 1026A may be used to detect an input user operation (for example, a tap operation), and in response to the user operation, the electronic device 100 may obtain related information of a nearby smart home device. In some embodiments, the related information of the smart home device may include an identifier and an index number of the smart home device.

The identifier of the smart home device 200 is used to indicate the smart home device 200, and may be a service set identifier (service set identifier, SSID) constructed by the smart home device 200, a media access control (MAC) address, or another identifier that can uniquely indicate the smart home device 200. When the electronic device 100 obtains the identifier of the smart home device 200, it may be considered that the electronic device 100 finds that the smart home device 200 exists nearby.

The index number of the smart home device 200 may also be referred to as a product identifier (product identifier, prodID), a serial number, or another name, and may be used to indicate a category, a manufacturer, or even a model of the smart home device 200. The index number of the smart home device 200 may be prestored in the smart home device 200 before delivery. The category of the smart home device may include but is not limited to: a smart socket, a smart lock, a smart lamp, a smart fan, a smart air conditioner, a smart curtain, a smart water dispenser, a smart body fat scale, a smart rice cooker, and the like. The model of the smart home device is used to indicate a smart home device of a specific hardware parameter in a category. For example, the smart socket may be classified into a model such as a three-hole socket or a two-hole socket, and the smart rice cooker may be classified into a model such as 1.5 L, 2 L, and 3 L according to a capacity. Table 1 provides examples of models of several possible smart home devices and corresponding index numbers.

TABLE 1

| Smart home device | Index number |
| --- | --- |
| Light bulb<br>Brand: Sansi; Model: C21GL-BE27; Rated power: 12 W; Input voltage: 220 V/50 Hz; Service life: 25,000 hours; Product material: Ceramics + PC; Interface: E27 interface<br>Beam angle: 60° | 3102150051701 |
| Ceiling lamp<br>Brand: Tospo; Model: CLL1060072; Color: Champagne gold + White; Dimension: 770 × 90 mm; Rated voltage: 220 V/50 Hz; Rated power: 72 W | 3102150053901 |
| Aroma lamp<br>Brand: Sleepace Sleepace; Model: SA1001-2; Color: White; Product dimension: 122.8 mm × 122.8 mm × 116.8 mm; Net weight: About 0.5 Kg | 3102150039301 |
| Air purifier<br>Brand: 720; Model: EP350; Color: White; Dimension: 400 mm × 200 mm × 600 mm | 3102150019001 |
| Wireless router<br>Brand: Huawei (HUAWEI); Model: WS832 | 10111040102302 |

The identifier and the index number of the smart home device 200 constitute no limitation. In some embodiments, the related information of the smart home device may further include information such as a picture and a default name of the smart home device. This is not limited in this application.

The following describes several methods in which the electronic device 100 obtains the related information of the nearby smart home device 200.

1. In response to the user operation received on the control 1026A, the electronic device 100 scans a message sent by the nearby smart home device 200, where the message carries the related information of the smart home device 200.

The smart home device 200 may send the message after being connected to a power supply or receiving a user operation (for example, a touch and hold operation of the user that is performed on a power button of the smart speaker). The smart home device 200 may continuously send the message.

In some embodiments, the message sent by the smart home device 200 carries the identifier and the index number of the smart home device 200. In some embodiments, the smart home device 200 may add the identifier and the index number to the sent message according to a preset rule. For example, the index number of the smart home device 200 may be placed in the identifier. Specifically, for example, the SSID of the smart home device 200 is Hi-OPPLE-Readlinglam-cN, and the index number of the smart home device 200 may be 0101. In this case, the smart home device 200 may insert the index number into the middle of the SSID: Hi-OPPLE-Readlinglam-0101cN. Correspondingly, after receiving the message sent by the smart home device 200, the electronic device 100 may parse the message according to a same preset rule, to obtain the identifier and the index number of the smart home device 200.

In some embodiments, the message may be a beacon frame (beacon frame) or a probe request frame (also referred to as a probe request) sent by the smart home device 200 by using a Wi-Fi technology. For example, the smart home device 200 may establish a temporary Wi-Fi network, that is, the smart home device 200 is in an access point (AP) mode, the electronic device 100 is in a workstation (station, STA) mode, and the electronic device 100 forms a local area network after accessing the temporary Wi-Fi network of the smart home device 200. For another example, the electronic device 100 may establish a temporary Wi-Fi network, that is, the electronic device 100 is in an access point (AP) mode.

The smart home device 200 is in a workstation (STA) mode, and the smart home device 200 forms a local area network after accessing the temporary Wi-Fi network of the electronic device 100. The smart home device 200 may send the beacon frame or the probe request over the temporary Wi-Fi network. After receiving the user operation performed on the control 1026A in the user interface 10, the electronic device 100 may perform a scanning operation on a Wi-Fi channel in response to the user operation. Duration in which the electronic device 100 performs the scanning operation may be preset duration, and the electronic device 100 may stop scanning after the preset duration. When a distance between the electronic device 100 and the smart home device 200 falls within an effective range of a Wi-Fi signal, the electronic device 100 may obtain, through scanning, the beacon frame or the probe request sent by the smart home device 200.

In some embodiments, the message may be a broadcast packet sent by the smart home device 200 by using a Bluetooth technology. After receiving the user operation performed on the control 1026A in the user interface 10, the electronic device 100 may perform a scanning operation on a Bluetooth channel in response to the user operation. Duration in which the electronic device 100 performs the scanning operation may be preset duration, and the electronic device 100 may stop scanning after the preset duration. When a distance between the electronic device 100 and the smart home device 200 falls within an effective range of a Bluetooth signal, the electronic device 100 may obtain, through scanning, the broadcast packet sent by the smart home device 200.

In addition to the Wi-Fi technology and the Bluetooth technology, in some embodiments, the message may alternatively be sent by the smart home device 200 by using another near field communication technology (for example, NFC).

Figure 4C:
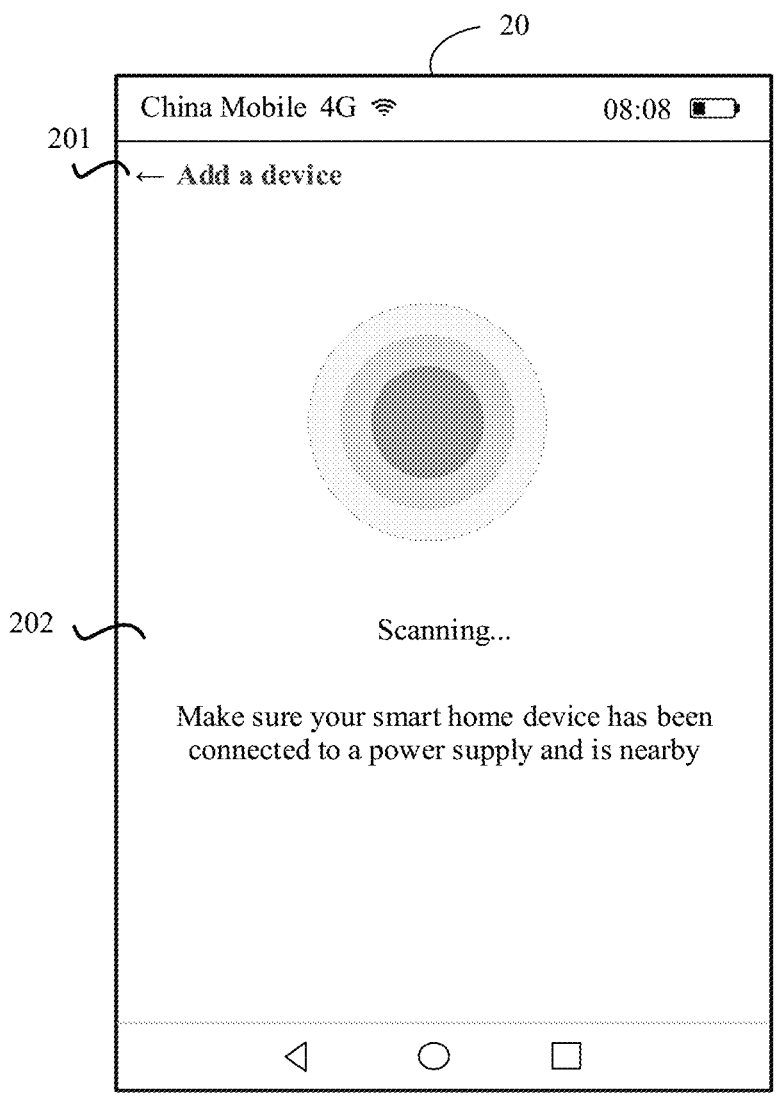

For example, referring to FIG. 4c, when obtaining the related information of the nearby smart home device 200 by using the foregoing first method, the electronic device may display a user interface 20. That is, in response to the user operation received on the control 1026A, the electronic device 100 may display the user interface 20 shown in FIG. 4c. The user interface 20 may include a control 201 for returning to an upper-level menu and prompt information 202.

The control 201 for returning to an upper-level menu may be used to receive an input user operation (for example, a tap operation), and the electronic device 100 may display the user interface 10 shown in 4a again in response to the user operation.

The prompt information 202 is used to prompt the user that the electronic device 100 is currently scanning a message sent by a nearby smart home device. For example, the prompt information 202 may be text information "Scanning . . . Make sure your smart home device has been connected to a power supply and is nearby". In addition to the text information, the prompt information 202 may be further in another form such as a picture. This is not limited in this application. In some embodiments, the user interface 20 may further include a status bar and/or a collapsible navigation bar. Herein, for the status bar, refer to the status bar 103 in FIG. 4a. For the navigation bar, refer to the navigation bar 104 in FIG. 4a. Details are not described herein again.

It may be understood that, in addition to an interaction element (the prompt information 202) shown in FIG. 4c as an example, the electronic device 100 may further prompt, in another manner, the user that the electronic device is currently scanning a message sent by a nearby smart home device. For example, the electronic device 100 may further play a voice.

2. In response to the user operation received on the control 1026A, the electronic device 100 scans a two-dimensional code provided by the nearby smart home device 200, where the two-dimensional code is used to indicate the identifier and the index number of the smart home device 200.

In some embodiments, if the smart home device 200 is provided with a display, the smart home device 200 may prestore the two-dimensional code before delivery, and display the two-dimensional code on the display after startup. In some embodiments, the two-dimensional code may be pasted on a surface of the smart home device 200 when the smart home device 200 is delivered from a factory.

In specific implementation, when receiving the user operation performed on the control 1026A for adding a device in the user interface 10, the electronic device 100 may turn on a camera in response to the user operation. The electronic device 100 may scan, through the camera, the two-dimensional code provided by the smart home device 200, and obtain the identifier and the index number of the smart home device 200 based on the two-dimensional code.

In addition to the foregoing two manners of obtaining the identifier and the index number of the smart home device 200, in some embodiments, the identifier and the index number of the smart home device 200 may be further obtained in another manner. For example, the electronic device 100 may further receive the identifier and the index number of the smart home device 200 that are input by the user.

In some embodiments, the small window 1026 shown in FIG. 4b may further include a control 1026B. The control 1026B may be used by the user to add a scene. The control 1026B may be used to receive an input user operation (for example, a tap operation). In response to the user operation, the electronic device 100 may display an interface used to add a scenario, set a smart home device in the scenario, and set a working state/working parameter of the smart home device. It may be understood that, after the user adds a new scenario by using the interface, an icon and a name of the new scenario may be added to the scenario list 1022.

FIG. 4a to FIG. 4d show examples of a scenario in which the electronic device 100 discovers the nearby smart home device 200. In this way, the electronic device 100 may obtain the related information of the nearby smart home device 200, including the identifier and the index number of the smart home device 200.

In some embodiments, after obtaining the index number of the smart home device 200, the electronic device 100 may obtain a control page of the smart home device 200 based on the index number. The following describes in detail a function and an obtaining manner of the control page of the smart home device.

The control page of the smart home device 200 may be used to set a working state, a working parameter, and the like of the smart home device 200. The working state of the smart home device may be "on" or "off". Different smart home devices correspond to different working parameters. For example, a working parameter of a smart lamp may include a color and a brightness, a working parameter of a smart speaker may include volume, and a working parameter of an air purifier may include a working mode (such as an automatic mode or a sleep mode) and a wind speed.

Because working parameters corresponding to smart home devices of different categories, manufacturers, or models are different, control pages corresponding to the smart home devices of different categories, manufacturers, or models are also different. That is, the control page of the smart home device 200 is related to a category, a manufacturer, or even a model of the smart home device 200. In some embodiments, the index number may be used to indicate a category, a manufacturer, or even a model of the smart home device 200. Therefore, the electronic device 100 may obtain the control page of the smart home device 200 by using the index number.

In some embodiments, the electronic device 100 may obtain the control page of the smart home device 200 based on the index number of the smart home device 200 in the following several manners:

1. Manner 1: The electronic device 100 sends a first request to the cloud server 300, where the first request carries the index number of the smart home device 200, and is used to request the cloud server 300 to send, to the electronic device 100, a link address of the device control page corresponding to the index number. The cloud server 300 sends the link address to the electronic device 100 in response to the first request. Correspondingly, the electronic device 100 obtains, from the link address sent by the cloud server 300, the device control page corresponding to the index number. The device control page corresponding to the index number is the control page of the smart home device 200. The link address may point to another server or device, that is, the electronic device 100 may obtain the control page of the smart home device 200 from the another server or device. In some embodiments, to ensure information security, the cloud server 300 may set a validity period of the link address, and the electronic device may obtain the device control page from the link address within the validity period.

2. Manner 2: The electronic device 100 sends a second request to the cloud server 300, where the second request carries the index number of the smart home device 200, and is used to request to obtain, from the cloud server 300, the device control page corresponding to the index number. In response to the second request, the cloud server 300 sends the device control page corresponding to the index number to the electronic device 100. Correspondingly, the electronic device 100 receives the device control page. The device control page is the control page of the smart home device 200. It may be understood that, in Manner 2, the cloud server 300 may store a plurality of control pages of the smart home device.

3. Manner 3: The electronic device 100 finds, from a plurality of prestored device control pages, the device control page corresponding to the index number of the smart home device 200. The device control page corresponding to the index number is the control page of the smart home device 200.

Specifically, before obtaining the smart home device 200 through scanning, the electronic device 100 may prestore a plurality of index numbers and device control pages corresponding to the index numbers, that is, the electronic device 100 prestores a plurality of control pages of smart home devices of different categories, different manufacturers, or different models. In some embodiments, when an application used to manage a smart home device is installed on the electronic device 100, the electronic device 100 may obtain the plurality of device control pages from the cloud server 300 and locally store the plurality of device control pages.

4. Manner 4: The electronic device 100 sends a third request to the cloud server 300, where the third request carries the index number of the smart home device 200, and is used to request the cloud server 300 to send a configuration file, where the configuration file is used by the electronic device 100 to generate the device control page of the smart home device 200. In response to the third request, the cloud server 300 sends, to the electronic device 100, the configuration file corresponding to the index number. Correspondingly, the electronic device 100 receives the configuration file, and generates the device control page of the smart home device 200 based on the configuration file.

Specifically, the configuration file includes data used to describe generation logic or a generation rule of the device control page, for example, used to describe a control included in the device control page (for example, including a control for adjusting a light brightness, a control for adjusting a light hue), and data of a layout rule. The electronic device 100 may generate a corresponding device control page based on the configuration file.

With reference to Manner 1, Manner 2, or Manner 4, in a process in which the electronic device 100 interacts with the cloud server 300, to ensure information security, the electronic device 100 may further encrypt the first request, the second request, or the third request by using a key. Correspondingly, after receiving the first request, the second request, or the third request, the cloud server 300 may decrypt the first request, the second request, or the third request according to an agreed encryption rule. Herein, the key may be delivered by the cloud server 300 to the electronic device 100 after the user uses the user account to log in to the application that is installed on the electronic device 100 and that is used to manage the smart home device. In some embodiments, the cloud server 300 may periodically update the key, and send an updated key to the electronic device 100.

In some embodiments, when the electronic device 100 obtains the identifier of the smart home device 200, it may be considered that the electronic device 100 discovers the smart home device. After obtaining the identifier of the smart home device 200, the electronic device 100 may prompt the user that the smart home device 200 exists nearby.

Figure 4D:
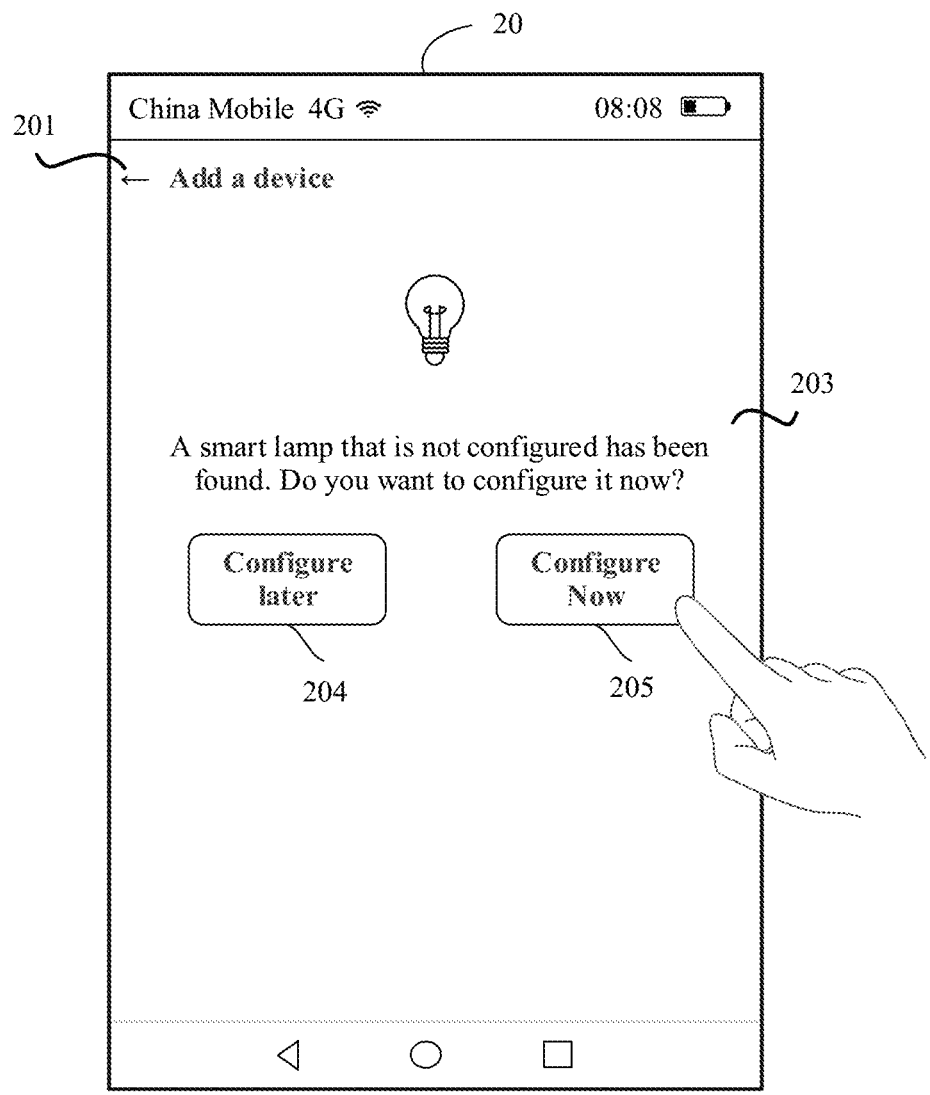

For example, referring to FIG. 4d, after obtaining the identifier of the smart home device 200, the electronic device may refresh the displayed user interface 20. A refreshed user interface 20 may be used to prompt the user that a smart home device exists nearby. As shown in FIG. 4d, the refreshed user interface 20 may include prompt information 203, a control 204, and a control 205.

The prompt information 203 is used to prompt the user that the smart home device 200 exists nearby. For example, the prompt information 203 may be text information "A smart lamp that is not configured has been found. Do you want to configure it now?". In addition to the text information, the prompt information 203 may be further in another form such as a picture. This is not limited in this application. "Not configured" may mean that the smart home device 200 has not established a dependency relationship with any user. In some embodiments, the electronic device 100 may also discover a smart home device that has established a dependency relationship with another user, that is, a same smart home device may establish a dependency relationship with a plurality of users.

The control 204 may be used to receive an input user operation (for example, a tap operation), and the electronic device 100 may display the user interface 10 shown in FIG. 4a in response to the user operation.

The control 205 may be used to receive an input user operation (for example, a tap operation), and in response to the user operation, the electronic device 100 may perform a procedure of establishing a dependency relationship between the user and the discovered smart home device 200. In some embodiments, after receiving the user operation on the control 205, the electronic device 100 may further display the control page of the smart home device 200 on the display. It may be understood that the procedure of establishing the dependency relationship between the user and the smart home device 200 is a procedure of information exchange between the electronic device 100, the smart home device 200, and the cloud server 300. That is, in some embodiments, before the user successfully establishes the dependency relationship with the smart home device 200, the electronic device 100 may display the control page of the smart home device 200. The control page of the smart home device is obtained by the electronic device 100 based on the index number of the smart home device 200. For an obtaining manner, refer to the foregoing related descriptions.

After receiving the user operation on the control 205, the electronic device 100 may display the control page of the smart home device 200 on the display in the following several manners:

1. In response to the user operation received on the control 205, the electronic device 100 directly displays the control page of the smart home device 200 on the display.

2. In response to the user operation received on the control 205, the electronic device 100 first displays an interface used to set an application scenario of the smart home device 200. After the user sets the application scenario of the smart home device 200 by using the interface, the control page of the smart home device 200 is displayed on the display. The application scenario of the smart home device 200 may reflect a placement location of the smart home device 200, for example, may include a living room, a master bedroom, a secondary bedroom, a kitchen, a study, and an office.

Figure 5:
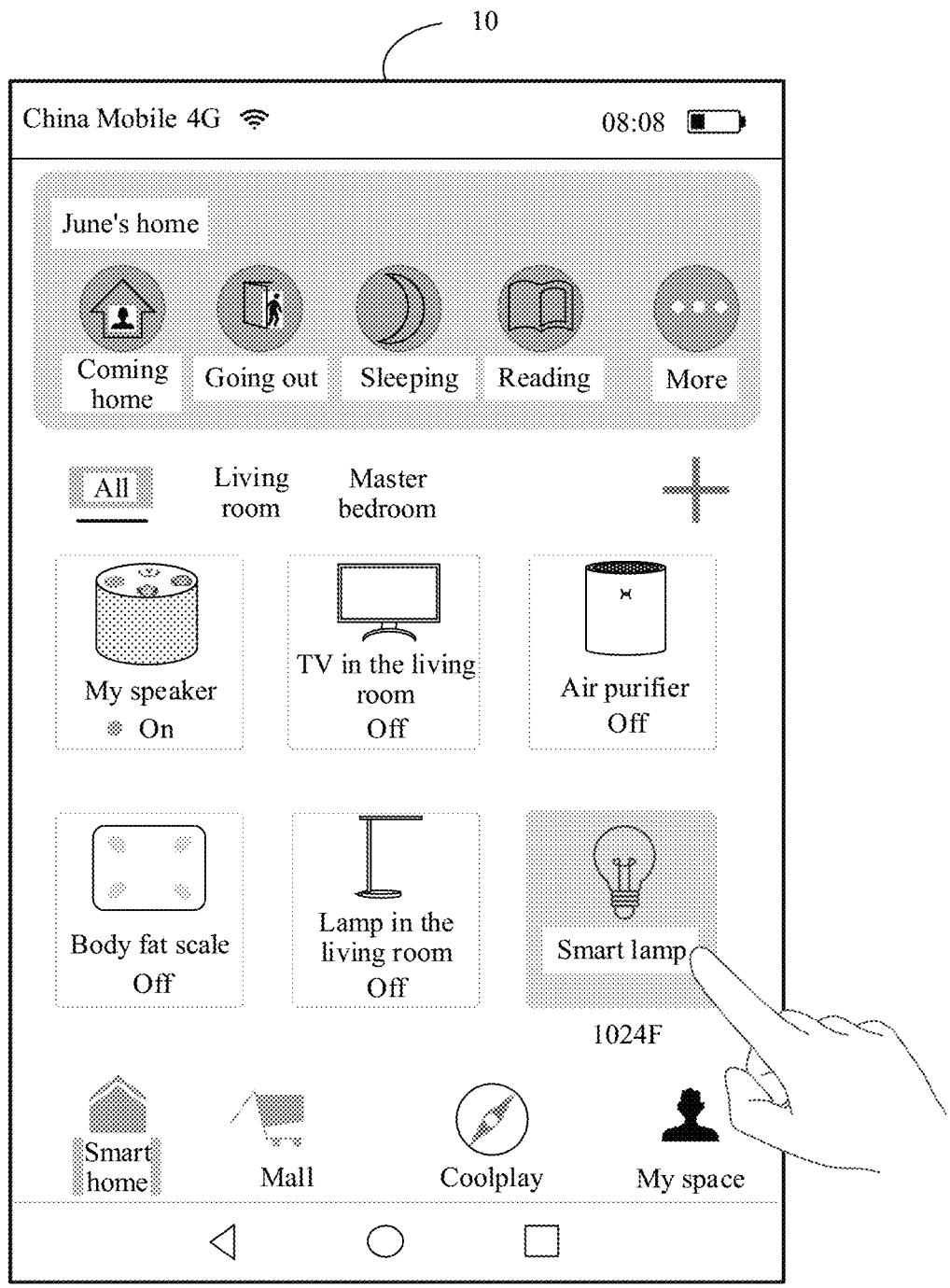

3. In response to the user operation received on the control 205, the electronic device 100 first displays a refreshed user interface 10. For example, FIG. 5 shows the refreshed user interface 10. Compared with the user interface 10 shown in FIG. 4*a*, in the user interface 10 shown in FIG. 5, display information 1024F of the smart home device 200 (for example, a smart lamp) discovered by the electronic device 100 is added to the smart home device list 1024. The display information 1024F of the smart home device 200 may be used to receive an input user operation (for example, a tap operation). In response to the user operation, the electronic device 100 displays the control page of the smart home device 200.

In some embodiments, the display information 1024F of the smart home device 200 shown in FIG. 5 may alternatively be displayed in a special form, to prompt the user that the smart home device 200 corresponding to the display information 1024F currently has not established a dependency relationship with the user. The user cannot actually control the smart home device 200 by using the control page 40. The special form may include but is not limited to: 1. Mask processing is performed on transparency of the display information 1024F, that is, the display information 1024F seen by the user is blurred. 2. A background color of the display information 1024F is a specific color, for example, black or red. For example, as shown in FIG. 5, the background color of the display information 1024F may be light black.

4. In response to the user operation received on the control 205, the electronic device 100 first displays an interface used to set an application scenario of the smart home device 200. After the user sets the application scenario of the smart home device 200 by using the interface, the user interface 10 shown in FIG. 5 is displayed on the display. The display information 1024F on the user interface 10 shown in FIG. 5 may be used to receive an input user operation (for example, a tap operation). In response to the user operation, the electronic device 100 displays the control page of the smart home device 200.

It may be understood that, when the user establishes a dependency relationship with the discovered smart home device 200, if the smart home device 200 configures a network, that is, the electronic device 100 sends information about an available network to the smart home device 200, before displaying the control page of the smart home device 200, the electronic device 100 may further display an interface used to send the information about the available network to the smart home device 200. A user interface 30 shown in FIG. 4*e* as an example is an implementation of the interface used to send the information about the available network to the smart home device 200. The user interface 30 is described in detail in a subsequent embodiment, and details are not described herein. That is, after receiving the user operation on the control 205, the electronic device 100 may further display the control page of the smart home device 200 on the display in the following several manners:

5. In response to the user operation received on the control 205, the electronic device 100 first displays an interface used to send information about an available network to the smart home device 200. After receiving the user operation used to send the information about the available network to the smart home device 200, the electronic device 100 displays the control page of the smart home device 200 on the display.

6. In response to the user operation received on the control 205, the electronic device 100 first displays an interface used to send information about an available network to the smart home device 200. After receiving the user operation used to send the information about the available network to the smart home device 200, the electronic device 100 displays, on the display, an interface used to set an application scenario of the smart home device 200. After the user sets the application scenario of the smart home device 200 by using the interface, the control page of the smart home device 200 is displayed on the display.

7. In response to the user operation received on the control 205, the electronic device 100 first displays an interface used to send information about an available network to the smart home device 200. After receiving the user operation used to send the information about the available network to the smart home device 200, the electronic device 100 displays the user interface 10 shown in FIG. 5 on the display. The display information 1024F of the smart home device 200 may be used to receive an input user operation (for example, a tap operation). In response to the user operation, the electronic device 100 displays the control page of the smart home device 200.

8. In response to the user operation received on the control 205, the electronic device 100 first displays an interface used to send information about an available network to the smart home device 200. After receiving the user operation used to send the information about the available network to the smart home device 200, the electronic device 100 displays, on the display, an interface used to set an application scenario of the smart home device 200. After the user sets the application scenario of the smart home device 200 by using the interface, the user interface 10 shown in FIG. 5 is displayed on the display. The display information 1024F on the user interface 10 shown in FIG. 5 may be used to receive an input user operation (for example, a tap operation). In response to the user operation, the electronic device 100 displays the control page of the smart home device 200.

Herein, for the interface used to set the application scenario of the smart home device 200 mentioned in the foregoing several manners, refer to a user interface 50 shown in the following embodiment in FIG. 10. The user interface 50 is described in detail in a subsequent embodiment, and details are not described herein.

The following describes in detail the control page of the smart home device 200 that is displayed by the electronic device 100.

For example, FIG. 6*a* to FIG. 6*g* show an implementation of the control page of the smart home device 200 that is displayed by the electronic device 100 before the user successfully establishes a dependency relationship with the smart home device 200 (for example, the smart lamp 201 in the smart home device management system shown in FIG. 1).

When the electronic device 100 displays a control page 40 shown in FIG. 6*a* to FIG. 6*g*, the user has not established a dependency relationship with the smart home device. Therefore, the control page 40 cannot be used to display an actual working state and an actual working parameter of the smart home device, and the user cannot set the working state and the working parameter of the smart home device in real time by using the control page 40. Herein, the real-time setting means that, after the user inputs a user operation on the control page 40, the smart home device can change the working state and/or the working parameter in a short time in response to the user operation.

In some embodiments, the electronic device 100 may display the control page 40 in a special form, to prompt the user that the smart home device has not established a dependency relationship with the user currently. The special form may include but is not limited to: 1. Mask processing is performed on transparency of the control page 40, that is, the control page 40 seen by the user is blurred. 2. A background color of the control page 40 is a specific color, for example, black or red. For example, as shown in FIG. 6*a* to FIG. 6*g*, the background color of the control page 40 may be light black.

As shown in FIG. 6*a* to FIG. 6*g*, the control page 40 of the smart lamp may include a control 401 for returning to an upper-level menu, a device information display area 402, a working state display and setting area 403, and a working parameter display and setting area 404. In some embodiments, the control page 40 of the smart lamp may further include a status bar and a collapsible navigation bar. For the status bar, refer to the navigation bar 103 in FIG. 4*a*. For the navigation bar, refer to the navigation bar 104 in FIG. 4*a*.

The control 401 for returning to an upper-level menu may be used to receive an input user operation (for example, a tap operation), and the electronic device 100 may display the user interface 10 shown in FIG. 5 in response to the user operation. For the user interface 10 shown in FIG. 5, refer to the foregoing related descriptions.

The device information display area 402 is used to display an image and a name of the smart lamp.

In some embodiments, the image of the smart lamp in the device information display area 402 is a picture of the smart lamp, and the name of the smart lamp in the device information display area 402 is a default name of the smart lamp. For example, the device information display area 402 shown in FIG. 6*a* includes the picture of the smart lamp and the default name "smart lamp" of the smart lamp. In an optional implementation, the picture and the default name of the smart lamp may be carried in related information of the smart lamp that is obtained when the electronic device 100 discovers the smart lamp. For a manner in which the electronic device 100 obtains the related information of the smart lamp, refer to the foregoing related descriptions. In another optional implementation, the picture and the default name of the smart lamp may alternatively be directly carried in the control page obtained by the electronic device 100.

In some embodiments, the image of the smart lamp in the device information display area 402 may be obtained by the electronic device 100 through the camera. To be specific, the electronic device 100 may start the camera, and display, in real time in the device information display area 402, a real image of the smart lamp that is obtained by the camera. For example, the image of the smart lamp in the device information display area 402 shown in FIG. 6*b* is a real image of the smart lamp that is obtained in real time by a camera of the electronic device 100.

In some embodiments, if the user sets an application scenario of the smart lamp, the name of the smart lamp in the display area 402 may be used to prompt the user of the application scenario of the smart lamp. For example, the name of the smart lamp in the device information display area 402 shown in FIG. 6*b* may be "a lamp in the dining room".

The working state display and setting area 403 may be used to display a default working state. It should be noted that the default working state is not an actual working state of the smart home device 200, but a preset virtual working state such as "off".

The working parameter display and setting area 404 may be used to display a default working parameter. It should be noted that the default working parameter is not an actual working parameter of the smart home device 200, but a preset virtual working parameter. For example, a light of the smart lamp is yellow, a color temperature of the smart lamp is cold white, and a brightness of the smart lamp is 55%.

In some embodiments, before the user successfully establishes a dependency relationship with the smart home device 200 (for example, the smart lamp 201 in the smart home device management system shown in FIG. 1), the control page 40 of the smart home device 200 that is displayed by the electronic device 100 may be used by the user to set a working state and/or a working parameter of the smart home device 200, and provide a corresponding feedback on the control page 40 based on the working state and/or the working parameter set by the user, so that the user can be familiar with a control method of the smart home device 200 and learn of various functions of the smart home device 200 in advance by using the control page 40. The following describes, by using an example, a process of interaction between the user and the control page 40 before the user successfully establishes the dependency relationship with the smart home device 200.

The control page 40 of the smart home device 200 may be used by the user to set a working state of the smart home device 200. Specifically, the working state display and setting area 403 may be further used to receive an input user operation (for example, a tap operation). In response to the user operation, the electronic device 100 may switch to displaying, in the area 403, information used to indicate the working state of the smart lamp. For example, referring to FIG. 6*c* and FIG. 6*d*, in response to the user operation received in the area 403, the electronic device 100 may switch a text used to indicate a working state in the area 403 from "off" to "on".

The control page 40 of the smart home device 200 may be used by the user to set a working parameter of the smart home device 200. Specifically, the working parameter display and setting area 404 may be further used to receive an input user operation (for example, a tap operation or a slide operation). In response to the user operation, the electronic device 100 may switch to displaying, in the area 404, information used to indicate the working parameter of the smart lamp. The working parameter of the smart lamp may include a color of a light, a color temperature of the light, a brightness of the light, a time of a timing switch, a time of a countdown switch, and the like that are shown on the control page 40 as an example. For example, referring to FIG. 6*d* and FIG. 6*e*, the user may input a slide operation into an indicator bar of light brightness in the area 404 to select a desired brightness. In response to the user operation received in the area 404, the electronic device 100 may display an indication bar of light brightness after the slide operation in the area 404, and may also change a text for indicating a light brightness (for example, change the text "Brightness: 55%" to "Brightness: 83%"). For example, referring to FIG. 6*e* and FIG. 6*f*, the user may input a user operation (for example, a tap operation) into a control for indicating a light color in the area 404. In response to the user operation, the electronic device may display a color adjustment window. After the user selects a desired color in the color adjustment window, the electronic device 100 may change a text used to indicate a light color in the area 404, for example, may change the text "Color: Yellow" to "Color: Blue".

In some embodiments, the device information display area 402 may be further used to display a simulated operating state of the smart home device when the smart home device runs according to the working state indicated by the area 403 and the working parameter indicated by the area 404. The simulated operating state corresponds to the working state indicated by the area 403 and the working parameter indicated by the area 404, that is, corresponds to the selection operations in the area 403 and the area 404.

Specifically, in some embodiments, the device information display area 402 may be used to superimpose a simulated effect on the image of the smart home device, and the simulated effect may reflect the simulated operating state of the smart home device. The simulated effect may include but is not limited to: removing/enhancing a bright effect on the image of the smart lamp, and the like. For example, referring to FIG. 6c, the electronic device may present, in the device information display area 402, a simulated effect when the working state of the smart lamp is "off". The effect when the working state of the smart lamp is "off" may include a simulated effect of removing a bright effect on the image of the smart lamp, and the like. For example, referring to FIG. 6d, the electronic device may present, in the device information display area 402, a simulated effect when the working state of the smart lamp is "on". The effect when the working state of the smart lamp is "on" may include a simulated effect of superimposing a bright effect on the image of the smart lamp, and the like. For example, referring to FIG. 6e, the electronic device may present, in the device information display area 402, a simulated effect obtained after a brightness of the smart lamp is increased. For example, referring to FIG. 6g, when the image of the smart lamp in the device information display area 402 is a real image of the smart lamp that is actually obtained by the camera of the electronic device, the electronic device may superimpose, on the real image, a simulated effect when the smart lamp runs according to the working state indicated by the area 403 and the working parameter indicated by the area 404. For example, in FIG. 6g, a simulated effect of a blue light, a simulated effect of a cold white light, and a simulated effect of a brightness of 83% are superimposed on the real image. It may be understood that a manner of superimposing the simulated effect on the real image shown in FIG. 6g may present an effect similar to augmented reality (augmented reality, AR).

It may be understood that, when the electronic device 100 displays the control page 40 shown in FIG. 6a to FIG. 6g, the user has not established a dependency relationship with the smart lamp. An effect of the smart home device displayed in the device information display area 402 when the smart home device runs according to the working state indicated by the area 403 and the working parameter indicated by the area 404 is a simulated effect, and an actual smart lamp does not present an effect the same as the simulated effect. That is, in a case in which the user has not established a dependency relationship with the smart home device, when detecting an input user operation in the working state display and area 403 or the working parameter display and area 404, the electronic device does not send a control instruction used to set a working state or a working parameter to the smart home device 200, that is, the electronic device 100 cannot control the smart home device.

It may be understood that arrangements of areas on the control page of the smart lamp shown in FIG. 6a to FIG. 6g are merely examples. In specific implementation, the arrangements of the areas on the control page may be different. For example, the device information display area 402 may occupy a larger display area, and the area 403 and the area 404 may be displayed in a hover box above the device information display area 402.

FIG. 6a to FIG. 6g show the control page of the smart lamp, and an element included in a control page of a smart home device of another type, manufacturer, or model may be different from that in FIG. 6a to FIG. 6g. For example, a control page of the air purifier may include a device information display area, a switch control, and a working parameter setting area. A working parameter of the air purifier may include a remaining amount of a filter element (for example, 91%), an amount of purified air (for example, 1345 m³), an amount of filtered particulate matter (for example, 89 mg), a working mode (for example, an automatic mode or a sleep mode), a wind speed, a time of a timing switch, and the like.

It can be learned from the foregoing descriptions of the control page 40 shown in FIG. 6a to FIG. 6g that, in some embodiments, after the electronic device 100 discovers the nearby smart home device 200 and before the user establishes a dependency relationship with the smart home device 200, the electronic device 100 may display the control page of the smart home device 200. The user may be familiar with a function and a control method of the smart home device 200 in advance by using the control page, and may intuitively sense a simulated effect presented when the smart home device 200 runs according to a working state and/or a working parameter set by the user.

In some embodiments, when displaying the control page 40 shown in FIG. 6a to FIG. 6g, the electronic device 100 may perform a procedure of establishing a dependency relationship between the user and the smart home device 200. This process is time-consuming to some extent (for example, more than 10 seconds). For the procedure, refer to related descriptions in a subsequent embodiment, and details are not described herein.

In some embodiments of this application, after the user successfully establishes a dependency relationship with the smart home device 200, the electronic device 100 may prompt the user that the dependency relationship has currently been established with the smart home device 200. The electronic device 100 may prompt the user by using the following several methods: 1. If the user has not establish a dependency relationship with the smart home device 200, the electronic device 100 displays the control page of the smart home device 200 in a special form to prompt the user that the smart lamp has not established a dependency relationship with the user. In this case, the electronic device 100 may stop displaying the control page of the smart home device 200 in the special form after the user successfully establishes the dependency relationship with the smart home device 200. For example, referring to FIG. 7a and FIG. 7b, after the user successfully establishes the dependency relationship with the smart home device 200, the background color of the control page 40 of the smart lamp that is displayed by the electronic device 100 changes from light black to white. 2. The electronic device 100 may further prompt the user by displaying prompt information on a status bar, making a prompt tone, vibrating, or blinking an indicator.

Figure 7A:
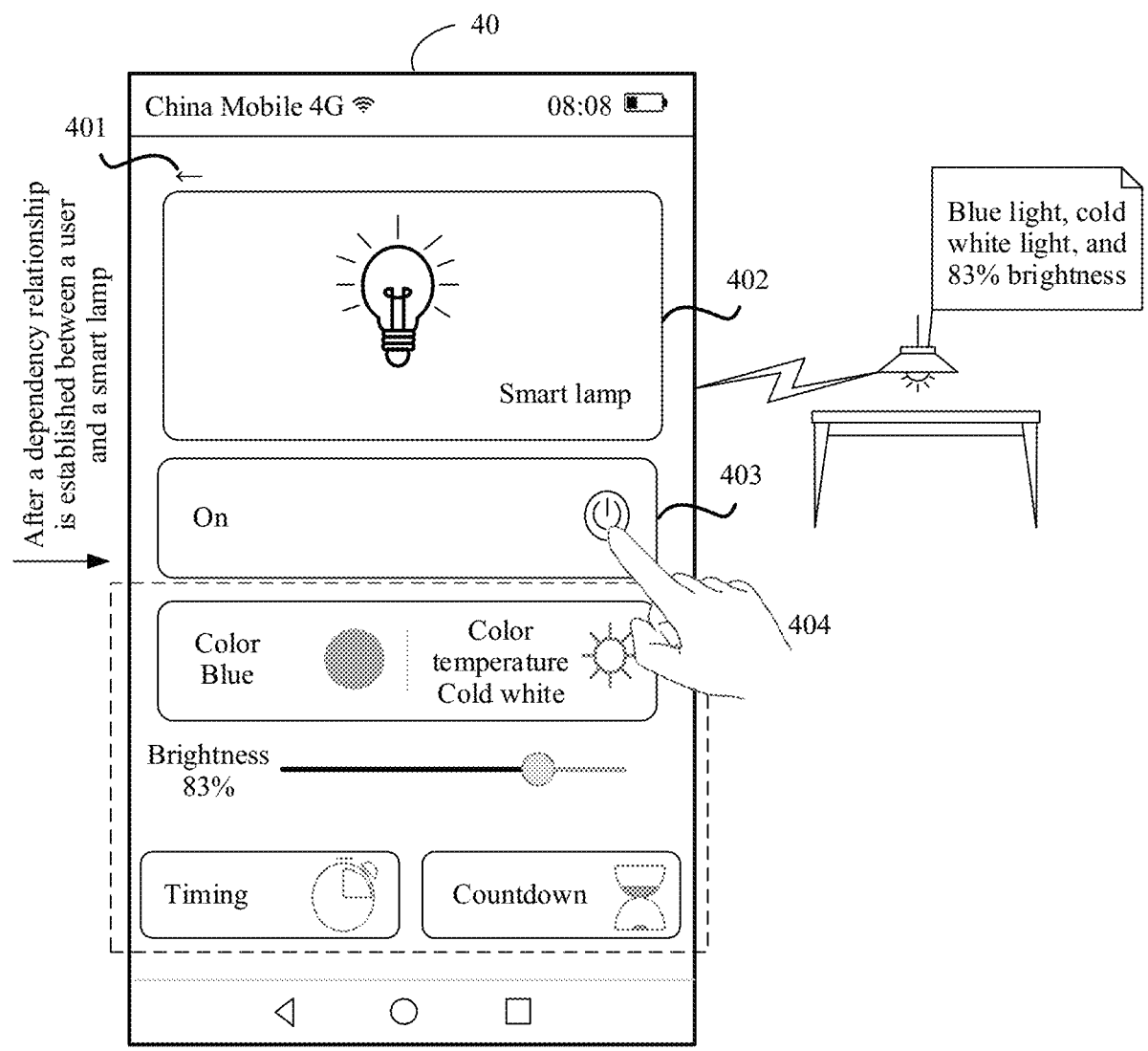
FIG. 7a and FIG. 7b are device control pages provided by an electronic device after a user successfully establishes a dependency relationship with a smart home device according to at least an embodiment of the present disclosure.
Figure 7B:
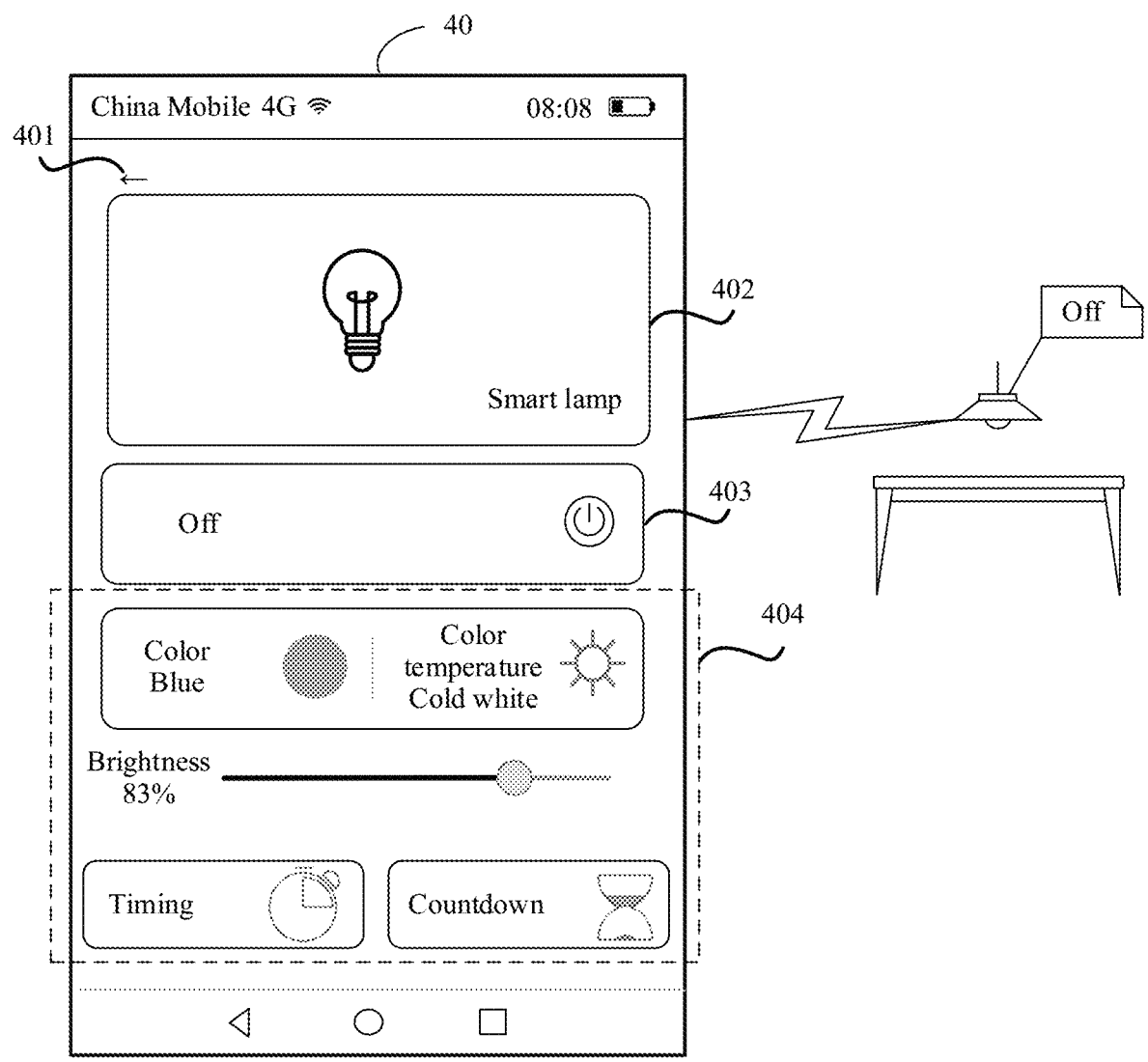

For example, FIG. 7a and FIG. 7b show an implementation of the control page of the smart home device 200 that is displayed by the electronic device 100 after the user successfully establishes a dependency relationship with the smart home device 200 (for example, the smart lamp 201 in the smart home device management system shown in FIG. 1).

As shown in FIG. 7a and FIG. 7b, the control page 40 may include a control 401 for returning to an upper-level menu, a device information display area 402, a working state display and setting area 403, and a working parameter display and setting area 404. In some embodiments, the control page 40 of the smart lamp may further include a status bar and a collapsible navigation bar. For the status bar, refer to the navigation bar 103 in FIG. 4*a*. For the navigation bar, refer to the navigation bar 104 in FIG. 4*a*.

Figure 6A:
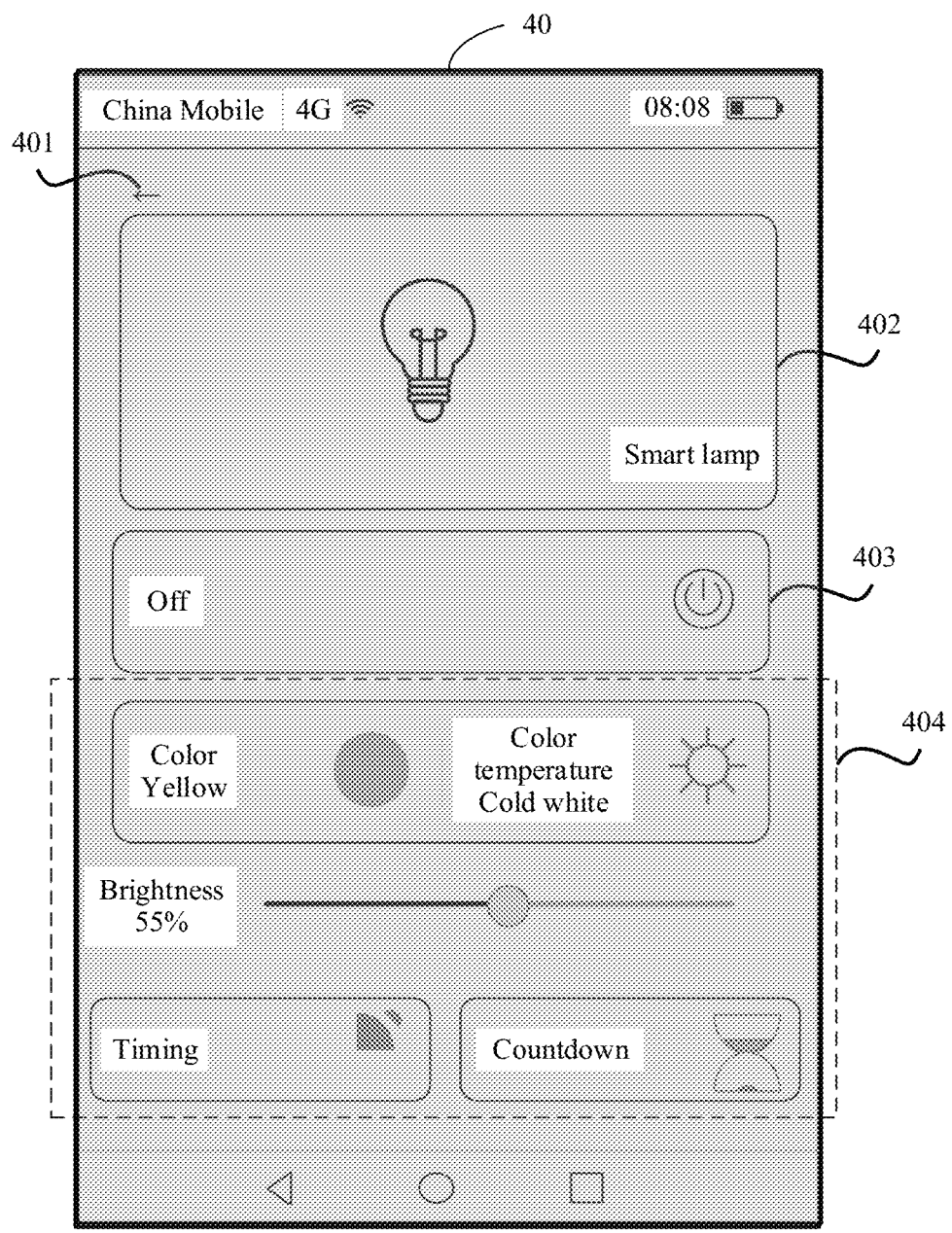
FIG. 6a to FIG. 6g are device control pages provided by an electronic device before a user successfully establishes a dependency relationship with a smart home device according to at least an embodiment of the present disclosure.
Figure 6B:
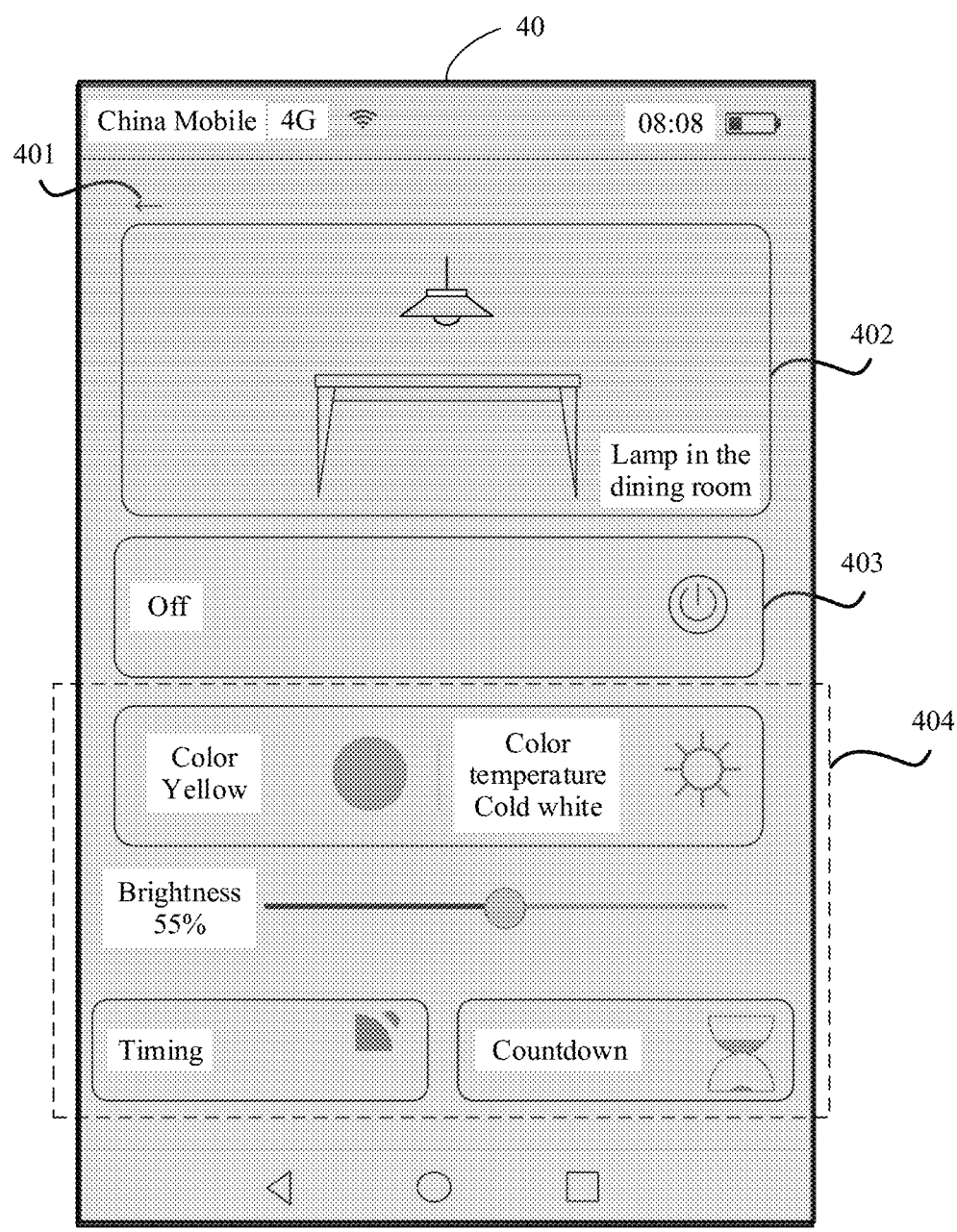
Figure 6C:
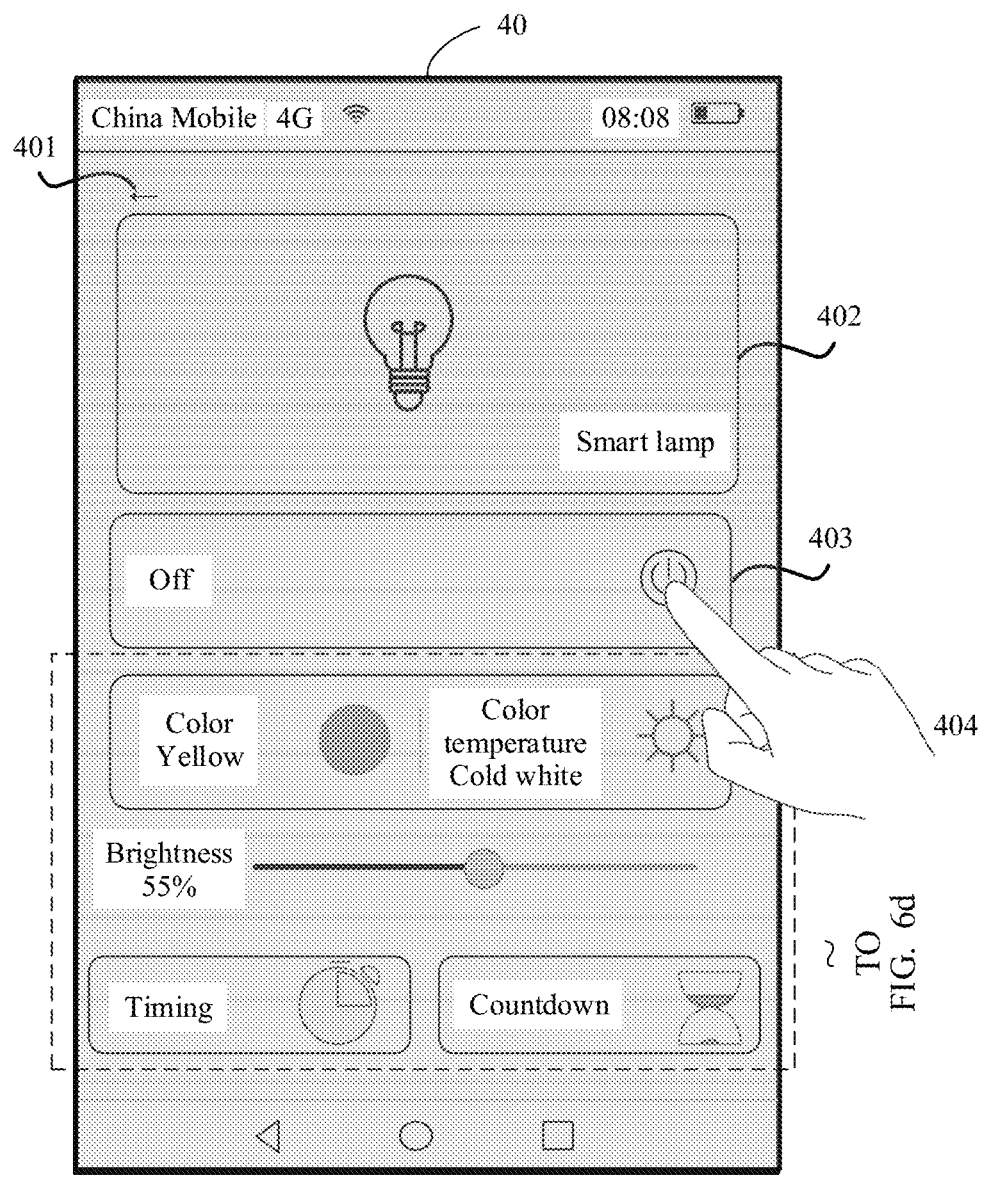
Figure 6D:
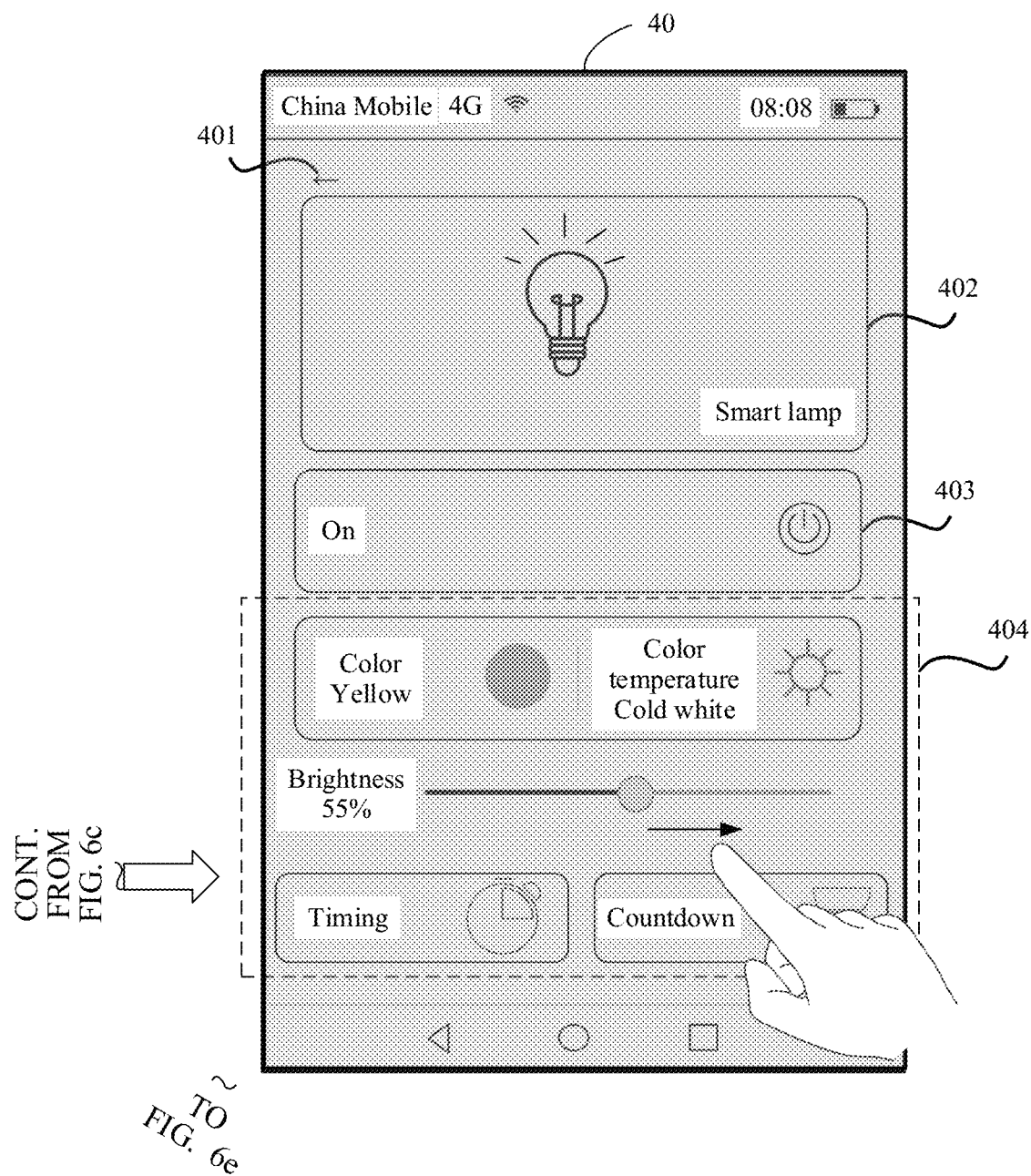
Figure 6E:
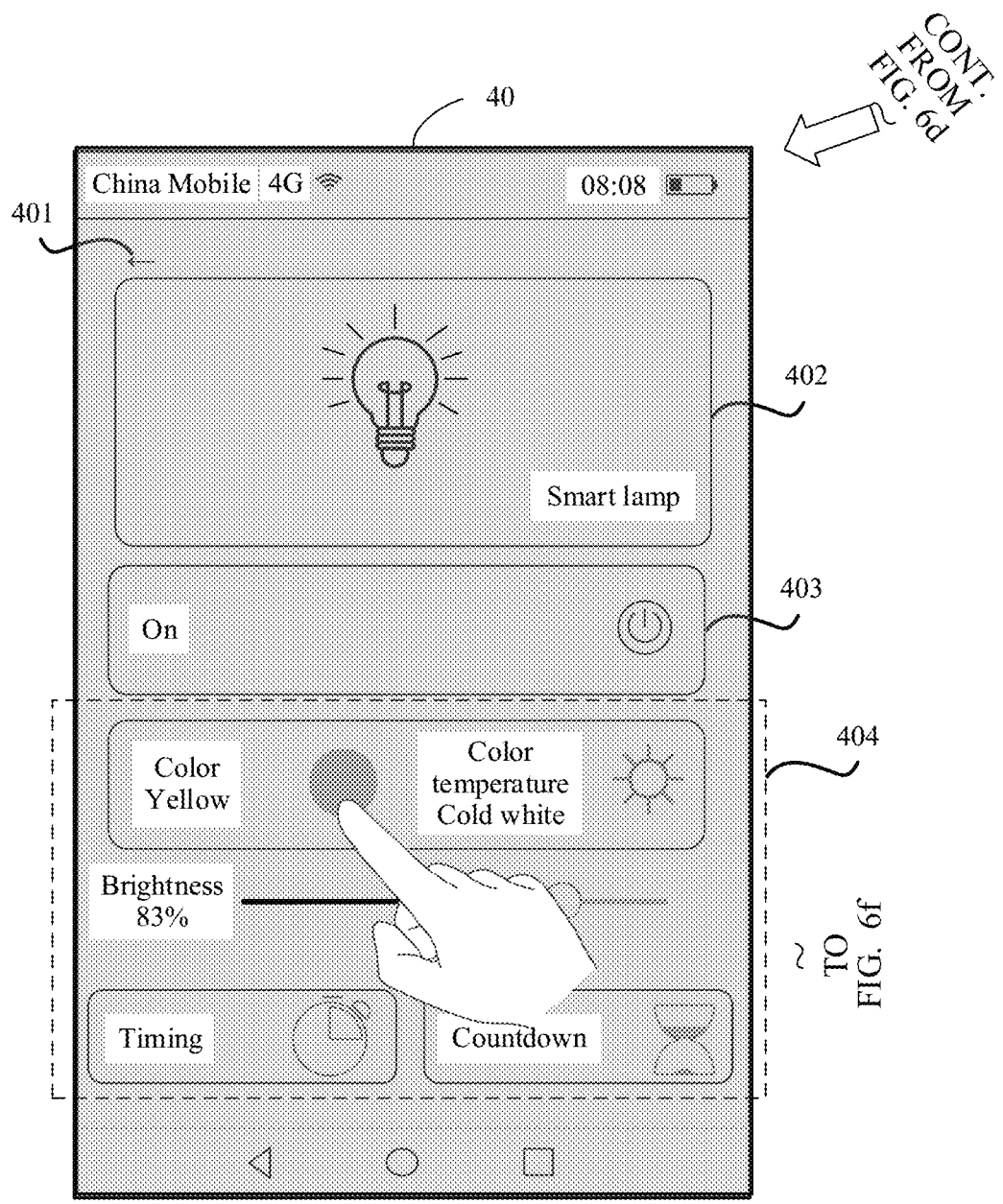
Figure 6F:
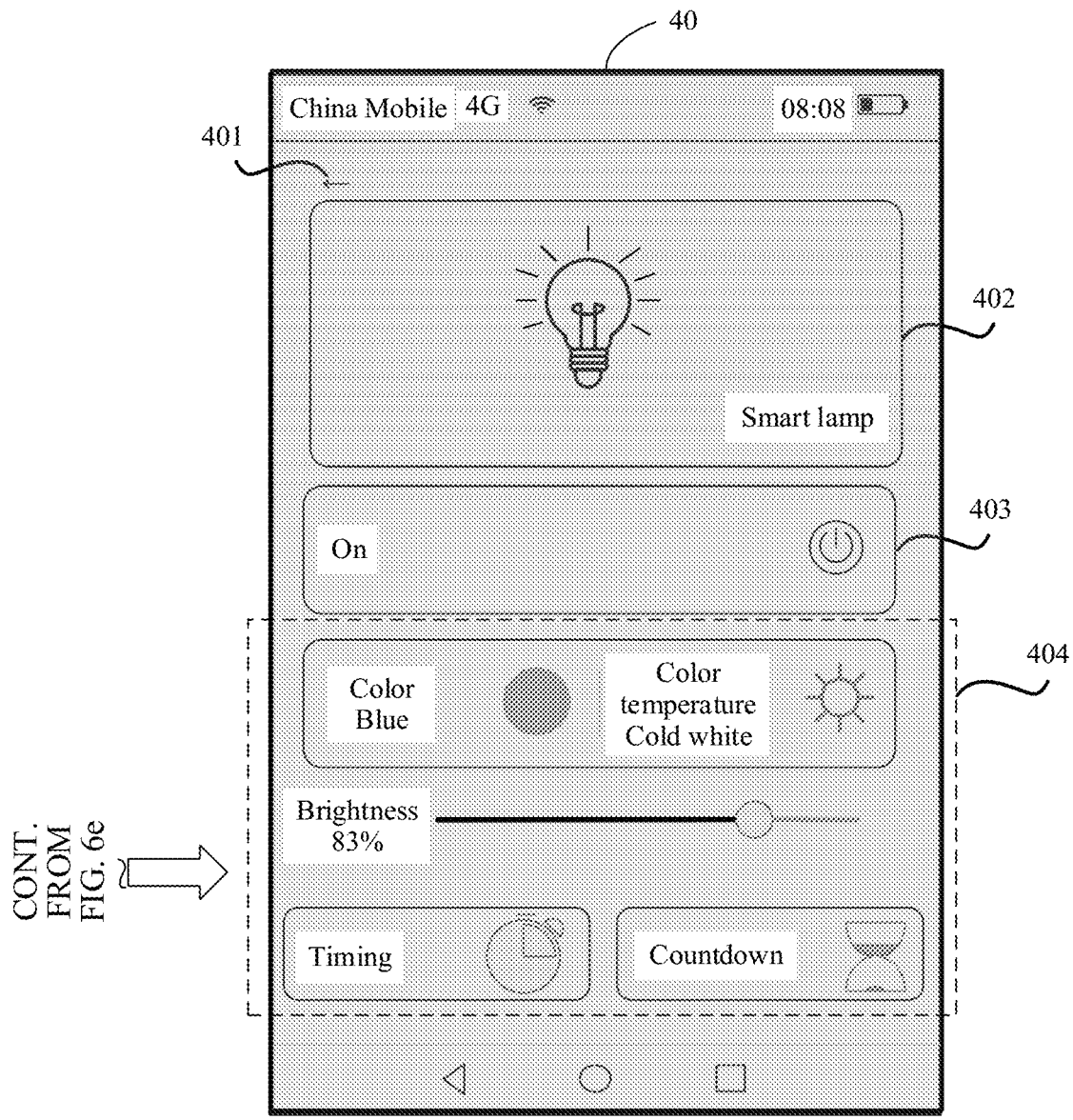
Figure 6G:
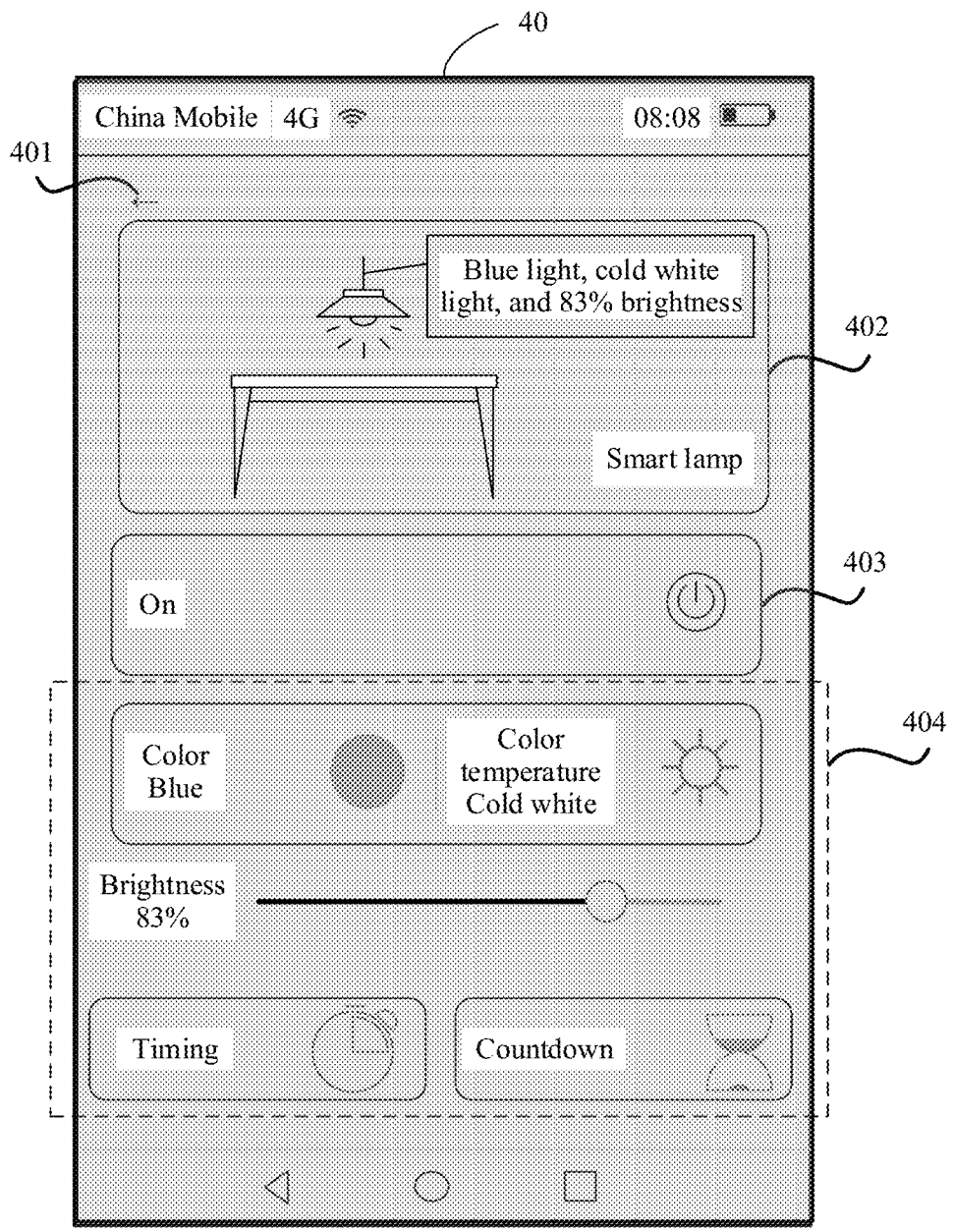

A difference between the control page 40 shown in FIG. 7*a* and FIG. 7*b* and the control page 40 shown in FIG. 6*a* and FIG. 6*b* lies in that the working state display and setting area 403 is used to display an actual working state of the smart home device 200, and the working parameter display and setting area 404 is used to display an actual working parameter of the smart home device 200. For specific implementation or a function of another control or another area on the control page 40 shown in FIG. 7*a* and FIG. 7*b*, refer to related descriptions in FIG. 6*a* and FIG. 6*b*. Details are not described herein again.

In some embodiments, after the user successfully establishes the dependency relationship with the smart home device 200, the electronic device 100 may control the smart home device 200 based on the working state and the working parameter that are set by the user on the control page 40 of the smart home device 200.

In some embodiments, the user may set the working state and the working parameter on the control page 40 of the smart home device 200 before establishing the dependency relationship with the smart home device 200, and after the user establishes the dependency relationship with the smart home device 200, the electronic device 100 may control the smart home device 200 based on the working state and the working parameter that are set. For example, referring to FIG. 6*f*, before establishing the dependency relationship with the smart lamp, the user sets the working state (for example, the state is "on") and the working parameter (for example, the light color is blue, the color temperature is cold white, and the brightness is 83%) of the smart lamp on the control page 40. After the user establishes the dependency relationship with the smart lamp, referring to FIG. 7*a*, the electronic device 100 indicates the smart lamp to run according to the working state and the working parameter that are set, that is, the smart lamp emits the blue light, the color temperature is cold white, and the brightness is 83%.

In some embodiments, the user may alternatively set the working state and the working parameter on the control page 40 of the smart home device 200 after establishing the dependency relationship with the smart home device 200, and the electronic device 100 controls the smart home device 200 based on the working state and the working parameter that are set. For example, referring to FIG. 7*a* and FIG. 7*b*, after establishing the dependency relationship with the smart lamp, the user may input a user operation (for example, a tap operation) in the area 403 to change the working state of the smart lamp to "off". The electronic device 100 indicates, based on the working state set by the user, the smart lamp to be turned off.

Figure 8:
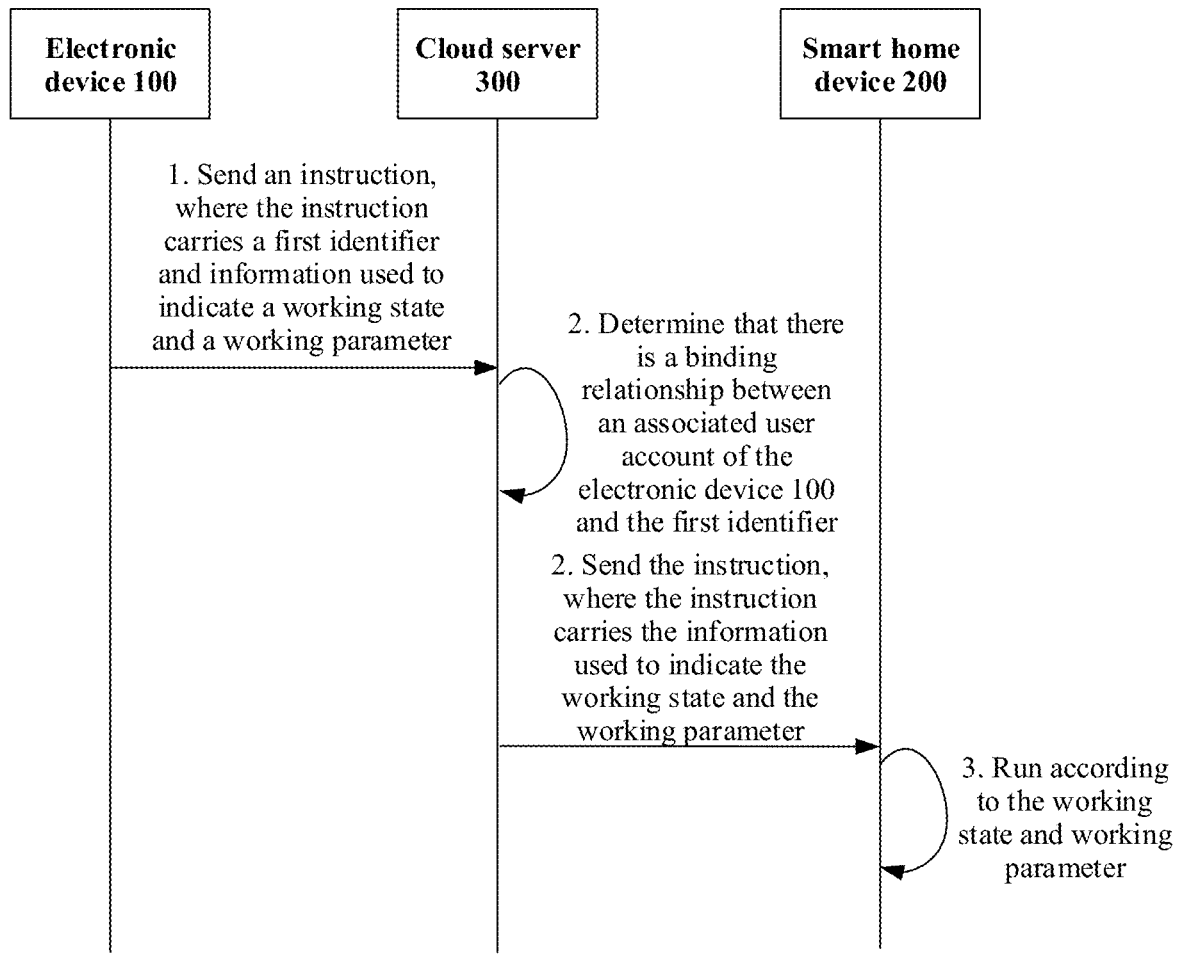
FIG. 8 is a schematic flowchart of operating, by an electronic device, a smart home device after a user successfully establishes a dependency relationship with the smart home device according to the present disclosure.

Specifically, FIG. 8 shows an example of a flowchart of a method in which the electronic device 100 controls, after the user successfully establishes the dependency relationship with the smart home device 200, the smart home device 200 based on the working state and the working parameter that are set by the user on the control page 40 of the smart home device 200. The method may include the following steps.

Step 1: The electronic device 100 sends a control instruction to the cloud server, where the control instruction carries a first identifier of the smart home device 200 and information used to indicate a working state and a working parameter that are set by a user on a control page of the smart home device 200.

Herein, the first identifier of the smart home device 200 is different from the identifier carried in the related information of the smart home device 200. The first identifier of the smart home device 200 may be allocated by the cloud server 300 to the smart home device 200. For details, refer to related descriptions in a subsequent procedure of establishing a dependency relationship between an associated user of the electronic device 100 and a discovered smart home device 200 in some embodiments. Details are not described herein.

Step 2: After receiving the control instruction sent by the electronic device 100, and determining that the associated user of the electronic device 100 has a dependency relationship with the smart home device 200, the cloud server 300 sends the control instruction to the smart home device based on the first identifier of the smart home device 200. The control instruction carries the information used to indicate the working state and the working parameter that are set by the user on the control page of the smart home device 200, and the control instruction is used to instruct the smart home device 200 to run according to the working state and the working parameter that are set by the user on the control page of the smart home device 200.

Specifically, the cloud server 300 manages user accounts of one or more users, and stores a binding relationship between each user account and the first identifier of the smart home device. After receiving the control instruction sent by the electronic device 100, the cloud server 300 may search for a user account associated with the electronic device 100, and determine whether there is a binding relationship between the user account associated with the electronic device 100 and the first identifier of the smart home device 200. If yes, it may be determined that the associated user of the electronic device 100 has the dependency relationship with the smart home device 200.

Step 3: The smart home device 200 receives the control instruction sent by the cloud server 300, and runs according to the control instruction and the working state and the working parameter that are set by the user on the control page.

For example, referring to FIG. 7*a*, on the control page 40 of the smart lamp, the user sets the working state of the smart lamp to on, and sets the color to yellow, the color temperature to cold white, and the brightness to 83% in the working parameter. The electronic device 100 may send a control instruction to the smart home device 200 through the cloud server 300, to instruct the smart lamp to be turned on and to present the yellow light, the color temperature in cold white, and the brightness of 83% during working.

For example, referring to FIG. 7*b*, the user sets the working state of the smart lamp to off on the control page 40 of the smart lamp, and the electronic device 100 may send a control instruction to the smart home device 200 through the cloud server 300, to instruct the smart lamp to be turned off.

In some embodiments, after the user successfully establishes the dependency relationship with the smart home device 200, the control page of the smart home device 200 that is displayed by the electronic device 100 may be used to display an actual working state and an actual working parameter of the smart home device.

Specifically, the user may directly contact the smart home device 200 to change the working state and the working parameter of the smart home device 200. For example, the user may touch a physical power key of the smart lamp to turn off the smart lamp, or touch a physical key of the smart lamp to change a color of a light emitted by the smart lamp. When the working state and/or the working parameter of the smart home device 200 changes, the smart home device 200 may send indication information of a changed working state and/or working parameter to the electronic device 100, so that the electronic device 100 can display the actual working state and the actual working parameter of the smart home device 200 on the control page of the smart home device 200.

Figure 9:
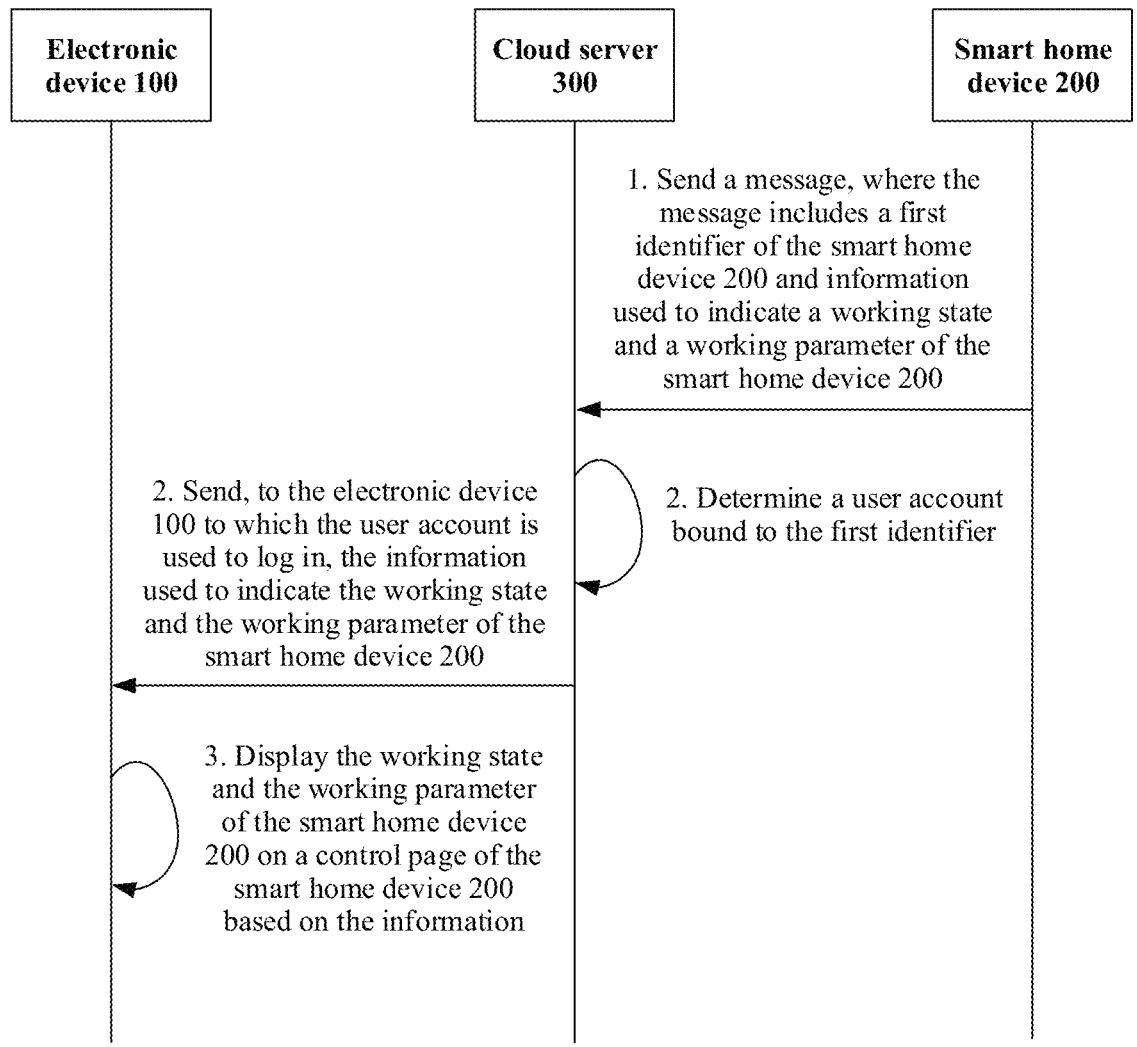
FIG. 9 is a schematic flowchart of displaying, by an electronic device, an actual working state and/or an actual working parameter of a smart home device after a user successfully establishes a dependency relationship with the smart home device according to the present disclosure.

Specifically, FIG. 9 shows an example of a flowchart of a method in which the electronic device 100 displays the actual working state and the actual working parameter of the smart home device 200 after the user successfully establishes the dependency relationship with the smart home device 200. The method may include the following steps.

Step 1: The smart home device 200 sends a message to the cloud server 300, where the message includes a first identifier of the smart home device 200 and information used to indicate a working state and a working parameter of the smart home device 200.

Step 2: The cloud server 300 receives the message sent by the smart home device 200, and determines a user account bound to the first identifier of the smart home device 200 in the message, and sends, to the electronic device 100 to which the user account is used to log in, the information used to indicate the working state and the working parameter of the smart home device 200.

Step 3: The electronic device 100 receives the information used to indicate the working state and the working parameter of the smart home device 200, and displays the working state and the working parameter of the smart home device 200 on a control page of the smart home device 200 based on the information.

In some embodiments, before the user successfully establishes the dependency relationship with the smart home device 200 (for example, the smart lamp 201 in the smart home device management system shown in FIG. 1), after displaying the control page of the smart home device 200, the electronic device may first display an interface used to set an application scenario of the smart home device 200.

Figure 10:
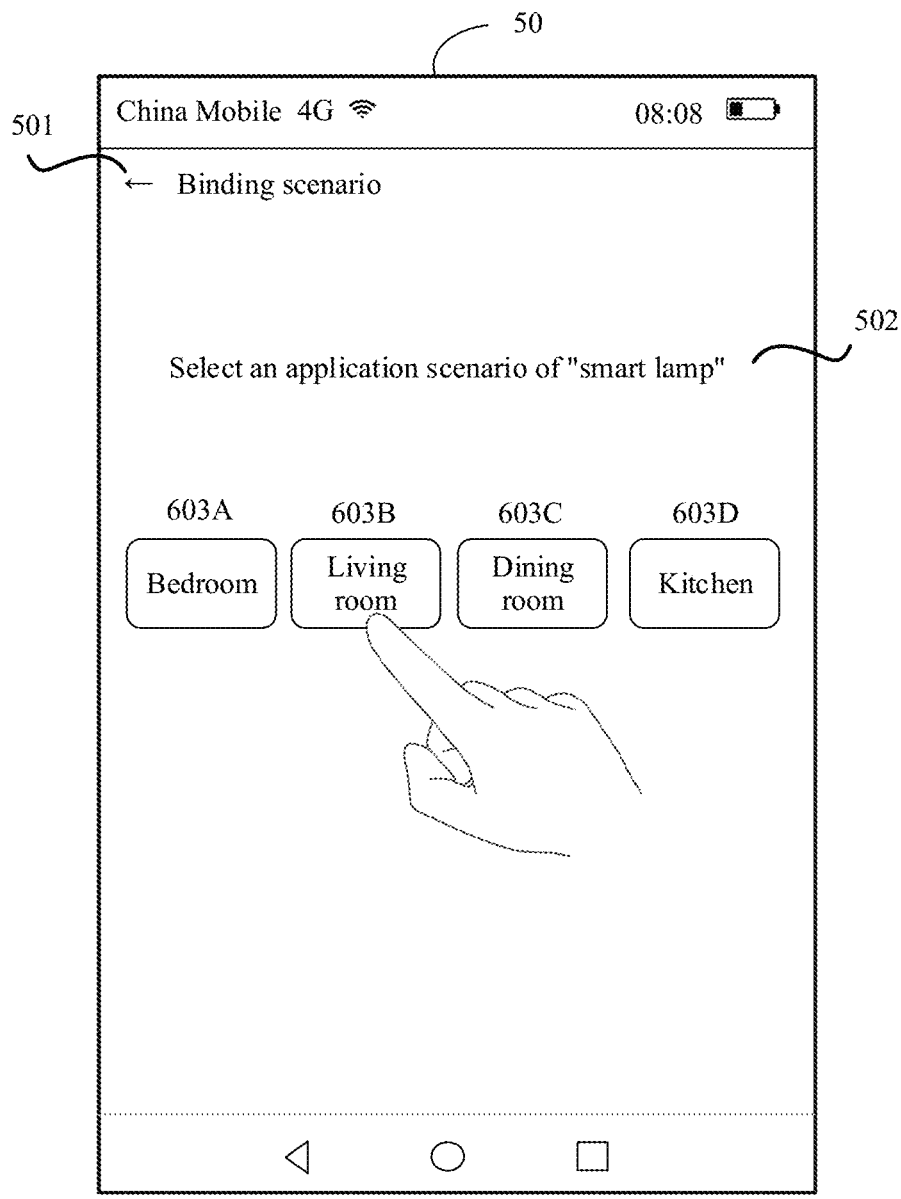
FIG. 10 is a schematic diagram of human-computer interaction used to set an application scenario of a smart home device according to at least an embodiment of the present disclosure.

The user interface 50 shown in FIG. 10 is an implementation of an interface used to set an application scenario of the smart home device 200. As shown in FIG. 10, the user interface 50 includes a control 501 for returning to an upper-level menu, prompt information 502, and one or more application scenario options 603A to 603D. In some embodiments, the user interface 50 may further include a status bar and a collapsible navigation bar. For the status bar, refer to the navigation bar 103 in FIG. 4*a*. For the navigation bar, refer to the navigation bar 104 in FIG. 4*a*.

The control 501 for returning to an upper-level menu may be used to receive an input user operation (for example, a tap operation). In response to the user operation, if the user has not successfully established a dependency relationship with the smart home device 200, the electronic device may display the user interface 10 shown in FIG. 5.

The prompt information 502 is used to prompt the user to set an application scenario of the smart home device. The prompt information 502 may be represented in a form of a text and/or an icon.

The one or more application scenario options 603A to 603D may be used to monitor an operation (for example, a touch operation) of setting an application scenario of the smart home device by the user. In response to the operation, the electronic device may set, as the application scenario of the smart home device, an application scenario corresponding to an application scenario option on which the operation is performed. The application scenario option may be represented in a form of a text and/or an icon. In addition to "bedroom", "living room", "dining room", and "kitchen" shown in FIG. 10, in specific implementation, more or fewer application scenario options may be further included. This is not limited in some embodiments.

After the user sets the application scenario of the smart home device, that is, in response to the operation performed on the application scenario option, if the user has successfully established a dependency relationship with the smart home device 200, the electronic device may display the control page 40 shown in FIG. 7*a* or FIG. 7*b*, or if the user has not successfully established a dependency relationship with the smart home device 200, the electronic device may display the control page 40 shown in FIG. 6*a* to FIG. 6*g*, and display the control page 40 shown in FIG. 7*a* or FIG. 7*b* after the user has successfully established the dependency relationship with the smart home device 200.

In some embodiments, a control page of the smart home device 200 that is displayed by the electronic device before the user successfully establishes the dependency relationship with the smart home device 200 may be referred to as a first user interface. A control used to adjust a working state and/or a working parameter of the smart home device in the first user interface is referred to as a first control, and an area used to display a simulated operation effect of the smart home device in the first user interface is referred to as a status display area. An example implementation of the first user interface may include the control page 40 shown in FIG. 6*a* to FIG. 6*g*, an example implementation of the first control includes the working state display and setting area 403 and the working parameter display and setting area 404 on the control page 40 shown in FIG. 6*a* to FIG. 6*g*, and an example implementation of the status display area may include the device information display area 402 on the control page 40 shown in FIG. 6*a* to FIG. 6*g*.

In some embodiments, a control page of the smart home device 200 that is displayed by the electronic device after the user successfully establishes the dependency relationship with the smart home device 200 may be referred to as a second user interface. A control used to adjust a working state and/or a working parameter of the smart home device in the second user interface is referred to as a second control, and an area used to display a simulated operation effect of the smart home device in the second user interface is referred to as a status display area. An example implementation of the second user interface may include the control page 40 shown in FIG. 7*a* and FIG. 7*b*, an example implementation of the second control includes the working state display and setting area 403 and the working parameter display and setting area 404 on the control page 40 shown in FIG. 7*a* and FIG. 7*b*, and an example implementation of the status display area may include the device information display area 402 on the control page 40 shown in FIG. 7*a* and FIG. 7*b*.

In some embodiments, after the user successfully establishes the dependency relationship with the smart home device 200, a working state of the smart home device 200 when the smart home device 200 runs according to the control instruction sent by the electronic device 100, and the working state and the working parameter that are set by the user on the control page may be referred to as a first operating state. The first operating state is an actual running state of the smart home device 200. After the user successfully establishes the dependency relationship with the smart home device 200, the status display area in the second user interface may be used to display a simulated operating state of the smart home device, and the simulated operation effect may correspond to the first operating state.

In some embodiments, the interface used to set the application scenario of the smart home device 200 may be referred to as a third user interface, and an application scenario option of receiving a user operation in the third user interface is referred to as a first application scenario option. An example implementation of the third user interface may include the user interface 50 shown in FIG. 10.

Figure 11:
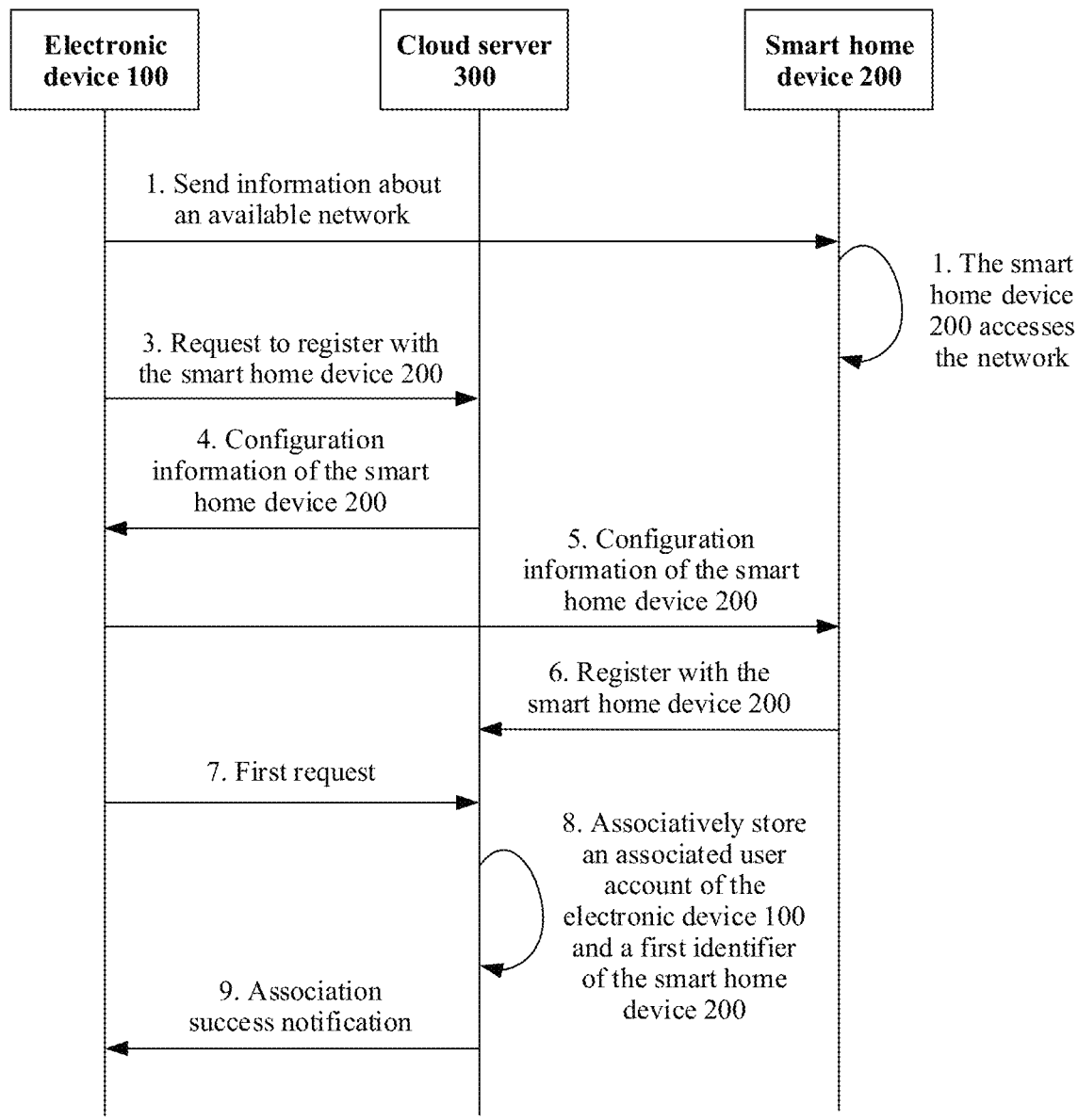
FIG. 11 is a schematic flowchart of establishing a dependency relationship between a user and a smart home device according to at least an embodiment of the present disclosure.

The following describes in detail a procedure of establishing a dependency relationship between the user and the smart home device 200 in some embodiments. Referring to FIG. 11, the procedure of establishing the dependency relationship between the user and the smart home device 200 may include the following steps.

Step 1: The electronic device 100 sends information about an available network to the smart home device 200.

The available network may be a wireless local area network, such as a Wi-Fi network. Herein, "available" means that the smart home device 200 is within signal coverage of the network. The information about the available network includes a name of the available network (for example, a service set identifier (service set identifier, SSID) of the Wi-Fi network) and a password of the available network.

The user may input a user operation (for example, a tap operation) into the control 205 in the user interface 20 shown in FIG. 4d and provided by the electronic device 100. In response to the user operation, the electronic device 100 may provide a user interface used to receive information about an available network that is input by the user.

Figure 4E:
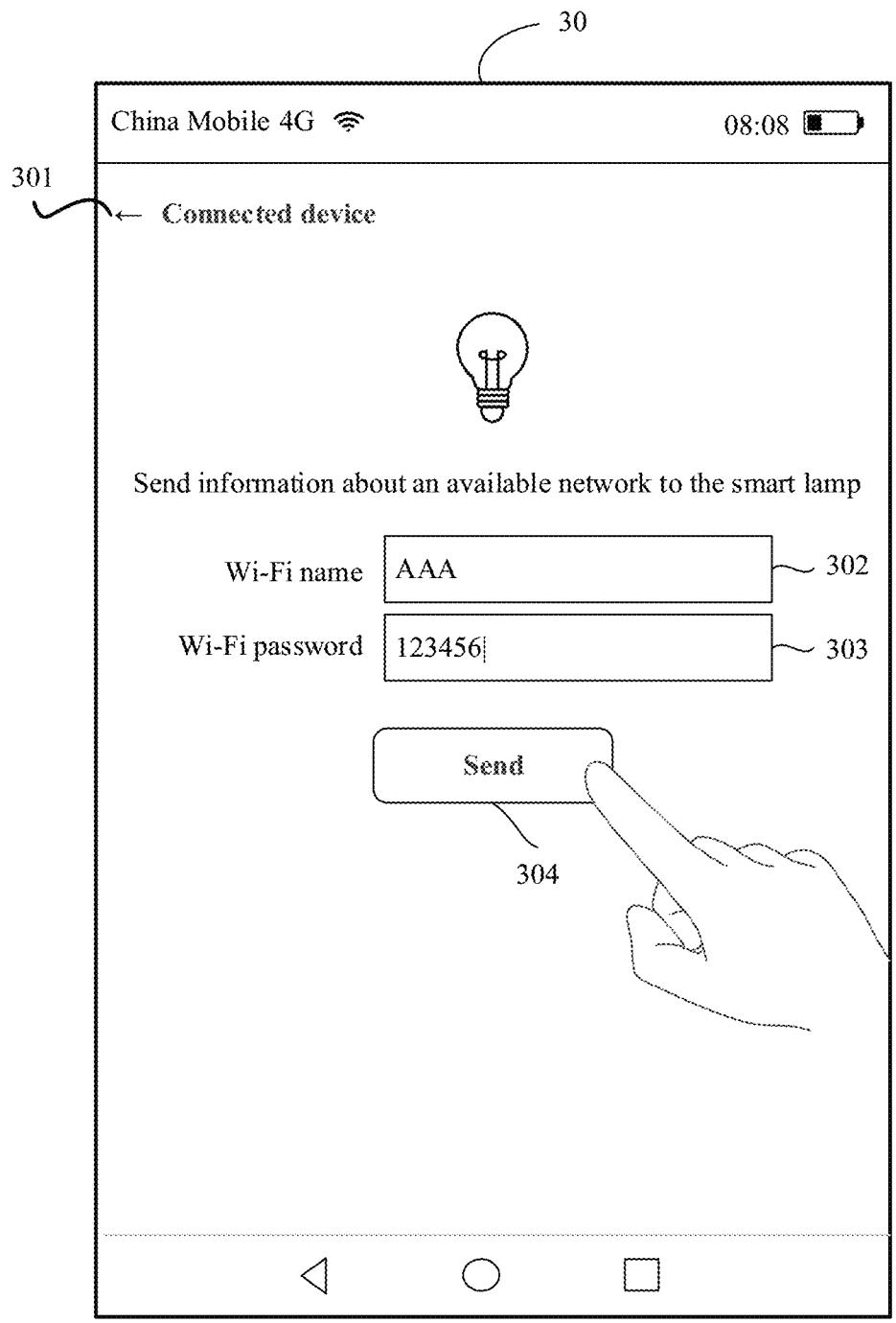

A user interface 30 shown in FIG. 4e as an example is an implementation of the user interface used to receive the information about the available network that is input by the user. As shown in FIG. 4e, the user interface 30 may include a control 301 for returning to an upper-level menu, an available network name input box 302, an available network password input box 303, and a control 304. In some embodiments, the user interface 30 may further include a status bar and a collapsible navigation bar. For the status bar, refer to the navigation bar 103 in FIG. 4a. For the navigation bar, refer to the navigation bar 104 in FIG. 4a.

The control 301 for returning to an upper-level menu may be used to receive an input user operation (for example, a tap operation), and the electronic device 100 may display the user interface 20 shown in 4d in response to the user operation.

The available network name input box 302 may be used to receive a name of an available network that is input by the user, for example, "AAA" shown in FIG. 4e. In some embodiments, if the electronic device 100 currently accesses a wireless local area network, the available network name input box 302 may be further automatically filled in a name of the wireless local area network accessed by the electronic device 100.

The available network password input box 303 may be used to receive a password of the available network that is input by the user, for example, "123456" shown in FIG. 4e.

The control 304 may be used to receive an input user operation (for example, a tap operation), and in response to the user operation, the electronic device 100 may send the information about the available network to the discovered smart home device 200. The following describes several manners in which the electronic device 100 sends the information about the available network to the smart home device 200.

In some embodiments, after being powered on, the smart home device 200 may establish a temporary Wi-Fi network, that is, the smart home device 200 is in an access point (AP) mode. The electronic device 100 is in a workstation (STA, station) mode, and the electronic device 100 forms a local area network after accessing the temporary Wi-Fi network of the smart home device 200. The electronic device 100 sends the information about the available network to the smart home device 200 over the temporary Wi-Fi network.

In some embodiments, the electronic device 100 may establish a temporary Wi-Fi network, that is, the electronic device 100 is in an access point (AP) mode. The smart home device 200 is in a workstation (STA, station) mode, and the smart home device 200 forms a local area network after accessing the temporary Wi-Fi network of the electronic device 100. The electronic device 100 sends the information about the available network to the smart home device 200 over the temporary Wi-Fi network.

In some embodiments, after being powered on, the smart home device 200 listens to all packets in the network. The electronic device 100 encodes the information about the available network into a UDP packet, and sends the information by using a broadcast packet or a multicast packet. After receiving the UDP packet, the smart home device 200 obtains the correct information about the available network through decoding. Certainly, the electronic device 100 may alternatively send the information about the available network to the smart home device 200 by using another communications protocol (for example, a near field communication protocol such as NFC or Bluetooth).

In some embodiments, in step 1, the electronic device 100 may send the encrypted information about the available network to the smart home device 200, to improve data transmission security. After receiving the encrypted information about the available network, the smart home device 200 can obtain the information about the available network by decrypting the information by using a corresponding key.

Step 2: The smart home device 200 accesses the network.

Specifically, the smart home device 200 automatically accesses the network after obtaining the information about the available network (for example, a network SSID and a password of the Wi-Fi network).

It may be understood that, in some embodiments, the smart home device 200 may alternatively access a network in another manner. That is, step 1 is an optional step. For example, the smart home device 200 may further access a network in the following manners:

(1) In some embodiments, the electronic device 100 may provide a two-dimensional code that carries information about an available network. The smart home device 200 is provided with a camera, and may scan the two-dimensional code through the camera, to obtain the information about the available network, and access the network by using the information about the available network.

(2) The smart home device 200 is provided with a display. The user may input information about an available network into the display, and the smart home device 200 accesses the network by using the information about the available network.

(3) The smart home device 200 is provided with a mobile communications module. The mobile communications module provides a solution that is applied to the smart home device 200 and that includes a wireless communications technology such as 2G/3G/4G/5G. That is, the smart home device 200 may directly access a wireless network such as 2G/3G/4G/5G.

Step 3: The electronic device 100 requests to register with the smart home device 200. In step 3, the electronic device 100 may provide first information of the smart home device 200 for the cloud server 300. The first information may be information such as a serial number or a media access control (MAC) address (for example, an 802.11 MAC address) of the smart home device 200. In some embodiments, the smart home device 200 may send the first information to the electronic device 100 by using the temporary Wi-Fi network established by the smart home device 200. In some embodiments, the smart home device 200 may alternatively send the first information to the electronic device 100 by using another communications protocol (for example, a near field communication protocol such as NFC or Bluetooth). For example, the first information may be carried in the related information of the smart home device 200 that is obtained when the electronic device 100 discovers the smart home device 200.

Step 4: In response to the request, the cloud server 300 provides configuration information of the smart home device 200 for the electronic device 100.

In some embodiments, the configuration information may include a first identifier of the smart home device 200. The first identifier may be used to pair the smart home device 200 with a user management account of the cloud server 300. In some implementations, the first identifier is generated by the cloud server 300 based on the first information, and may be a sequence number or a name that can uniquely identify the smart home device 200. In some other implementations, the first identifier is obtained by the cloud server 300 by querying a database, and the database stores a correspondence between first information and the configuration information of the smart device.

In some embodiments, the configuration information may further include a registration code, and the registration code is used by the cloud server 300 to subsequently verify an identity of the smart home device 200. Each time after accessing the network, the smart home device 200 that completes power-on registration for the first time requests to log in to the cloud server 300 by using the registration code. Because the configuration information (for example, the first identifier of the smart device) sent by the cloud server 300 is dynamically allocated, the configuration information is more secure and less likely to be disclosed or forged than the serial number or the MAC address of the smart home device 200.

Step 5: The electronic device 100 sends the configuration information (for example, the first identifier and/or the registration code of the smart home device 200) to the smart home device 200. The electronic device 100 may transmit the configuration information to the smart home device 200 through encryption.

Step 6: The smart home device 200 initiates registration with the cloud server 300. After the smart home device 200 can establish a communication connection to the cloud server 300, the smart home device 200 sends the configuration information (for example, the first identifier and/or the registration code of the smart home device 200) to the cloud server 300 and negotiate with the cloud server 300 about a communication key, to encrypt future communication between the smart home device 200 and the cloud server 300.

In this way, the smart home device 200 completes the step of accessing the Wi-Fi network, and establishes the communication connection to the server over the Wi-Fi network. This lays a foundation for subsequently receiving an operation instruction from the server.

Step 7: The electronic device 100 sends a fourth request to the cloud server 300, where the fourth request is used to request to bind to the smart home device 200. The fourth request may carry the first identifier of the smart home device 200. The first identifier may be dynamically generated by the cloud server 300, and therefore is not likely to be disclosed or forged.

Step 8: In response to the fourth request, the cloud server 300 associatively stores or binds the first identifier of the smart home device 200 with an associated user account of the electronic device 100, that is, establishes a dependency relationship between an associated user of the electronic device 100 and the smart home device 200.

Step 9: The cloud server 300 sends an association success notification to the electronic device 100.

After receiving the association success notification, the electronic device 100 may determine that the associated user of the electronic device 100 successfully establishes a dependency relationship with the smart home device 200. Then, the electronic device may control the smart home device, for example, control turn-on or turn-off of the smart home device, and adjust a light brightness of the smart home device.

In some embodiments, after step 1 and before step 9, that is, before the associated user of the electronic device 100 successfully establishes the dependency relationship with the smart home device 200, the procedure may further include the following step: Step 1-1: The electronic device 100 displays a control page of the smart home device. Herein, the user can be familiar with a control method of the smart home device 200 and learn of various functions of the smart home device 200 in advance by using the control page of the smart home device. For the control page, refer to the control page 40 shown in FIG. 6a and FIG. 6b.

In some embodiments, after step 9, that is, after the associated user of the electronic device 100 successfully establishes the dependency relationship with the smart home device 200, the procedure may further include the following step: Step 9-1: The electronic device 100 displays a control page of the smart home device. Herein, the user can actually control the smart home device by using the control page of the smart home device. For the control page, refer to the control page 40 shown in FIG. 7a.

Based on the electronic device 100 shown in FIG. 2, and the human-computer interaction embodiments shown in FIG. 4a to FIG. 4e, FIG. 5, FIG. 6a to FIG. 6g, FIG. 7a and FIG. 7b, and FIG. 10, the following describes a device control page display method according to an embodiment of this application.

Figure 12:
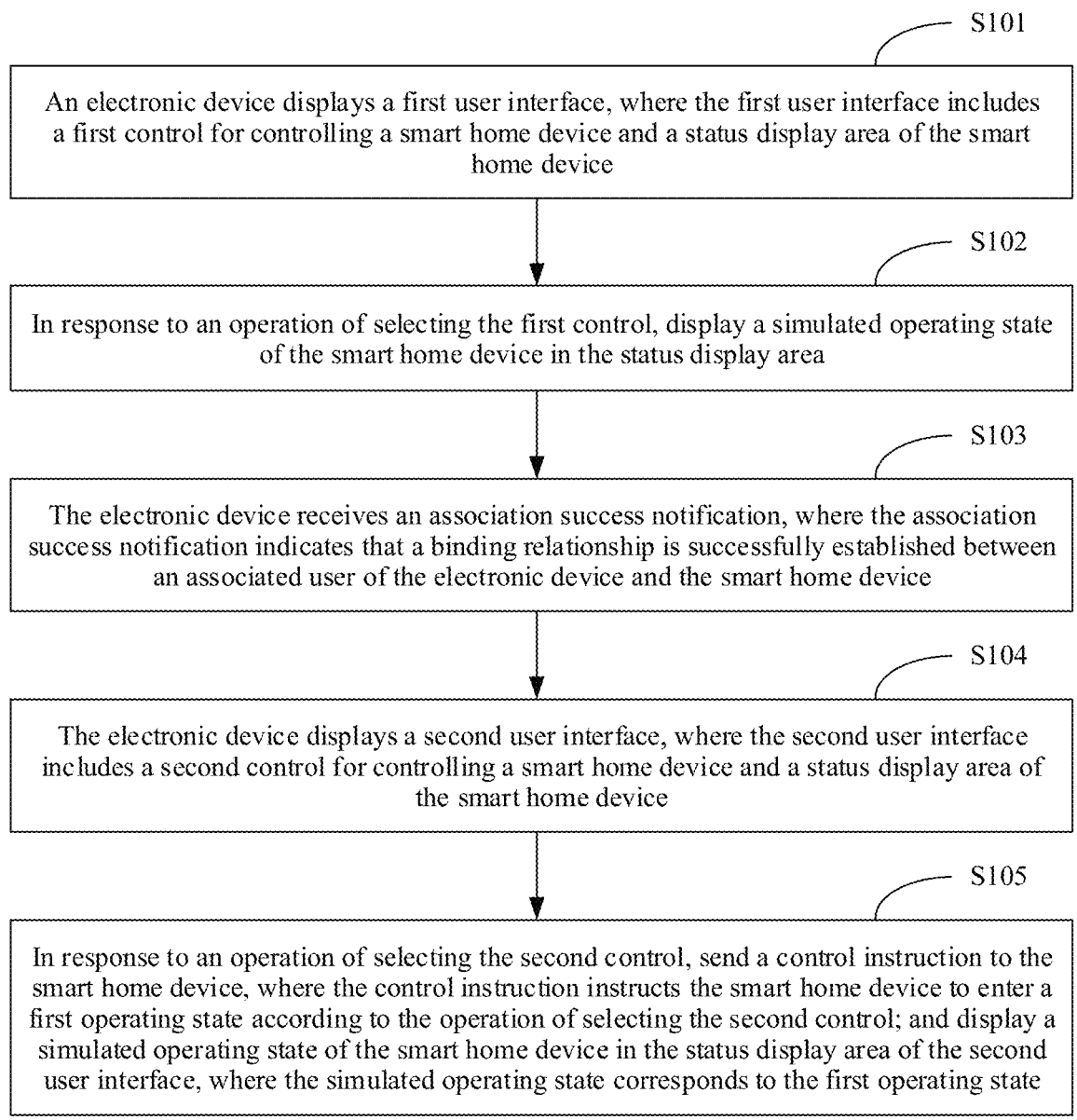
FIG. 12 is a schematic flowchart of a device control page display method according to at least an embodiment of the present disclosure.

FIG. 12 is a schematic flowchart of a device control page display method according to an embodiment of this application. As shown in FIG. 12, the method includes the following steps.

Step S101: An electronic device displays a first user interface, where the first user interface includes a first control for controlling a smart home device and a status display area of the smart home device.

An example implementation of the first user interface may include the user interface 40 shown in FIG. 6a to FIG. 6g, an example implementation of the first control for controlling a smart home device includes the working state display and setting area 403 and the working parameter display and setting area 404 on the user interface 40 shown in FIG. 6a to FIG. 6g, and an example implementation of the status display area of the smart home device may include the device information display area 402 on the user interface 40 shown in FIG. 6a to FIG. 6g. For details, refer to related descriptions in the foregoing embodiments Step S102: In response to an operation of selecting the first control, display a simulated operating state of the smart home device in the status display area.

An example implementation of the operation of selecting the first control may include an operation performed on the working state display and setting area 403 and the working parameter display and setting area 404 on the user interface 40 shown in FIG. 6a to FIG. 6g. For details, refer to related descriptions in the foregoing embodiments.

The simulated operating state of the smart home device may be a simulated operating state of the smart home device when the smart home device runs according to the working state indicated by the area 403 and the working parameter indicated by the area 404 on the user interface 40 shown in FIG. 6a to FIG. 6g. For example, the smart home device is a smart lamp. The simulated operating state may include but is not limited to the simulated operating state displayed in the area 402 on the user interface 40 shown in FIG. 6a to FIG. 6g, for example, a simulated operating state when the smart lamp is turned off, a simulated operating state when the smart lamp is turned on, a simulated operating state when the smart lamp emits a light of a specific color, or a simulated operating state when the smart lamp emits a light of a specific hue.

When the electronic device displays the first user interface, a binding relationship has not been successfully established between an associated user of the electronic device and the smart home device, and the electronic device cannot operate the smart home device. Therefore, in response to the operation of selecting the first control, the electronic device does not send a control instruction to the smart home device.

Step S103: The electronic device receives an association success notification, where the association success notification indicates that a binding relationship is successfully established between an associated user of the electronic device and the smart home device.

For the association success notification, refer to the association success notification mentioned in step 9 in the procedure of establishing the dependency relationship between the user and the smart home device 200 shown in FIG. 11. For details, refer to related descriptions.

In some embodiments, the association success notification is specifically used to indicate that an associated user account of the electronic device and a first identifier of the smart home device are successfully associatively stored. For the first identifier, refer to related descriptions in FIG. 11.

In some embodiments, between step S103 and step S104, the electronic device may further display a user interface used to set an application scenario of the smart home device. The user interface may be referred to as a third user interface. An example implementation of the third user interface may include the user interface 50 shown in FIG. 10. For details, refer to related descriptions in the foregoing embodiments.

Step S104: The electronic device displays a second user interface, where the second user interface includes a second control for controlling a smart home device and a status display area of the smart home device.

An example implementation of the second user interface may include the user interface 40 shown in FIG. 7a and FIG. 7b, an example implementation of the second control for controlling a smart home device includes the working state display and setting area 403 and the working parameter display and setting area 404 on the user interface 40 shown in FIG. 7a and FIG. 7b, and an example implementation of the status display area of the smart home device may include the device information display area 402 on the user interface 40 shown in FIG. 7a and FIG. 7b. For details, refer to related descriptions in the foregoing embodiments.

In some embodiments, the first user interface and the second user interface correspond to an index number of the smart home device. That is, the electronic device may obtain the first user interface and the second user interface based on the index number of the smart home device. The index number is used to indicate one or any combination of a category, a manufacturer, or a model of the smart home device. For a manner in which the electronic device obtains the index number, refer to related descriptions in the foregoing embodiments. For a manner in which the electronic device obtains the first user interface and the second user interface based on the index number, refer to related descriptions in the foregoing embodiments.

Step S105: In response to an operation of selecting the second control, send a control instruction to the smart home device, where the control instruction instructs the smart home device to enter a first operating state according to the operation of selecting the second control; and display a simulated operating state of the smart home device in the status display area of the second user interface, where the simulated operating state corresponds to the first operating state.

An example implementation of the operation of selecting the second control may include an operation performed on the working state display and setting area 403 and the working parameter display and setting area 404 on the user interface 40 shown in FIG. 7a and FIG. 7b, for example, an operation performed on the area 403 shown in FIG. 7a. For details, refer to related descriptions in the foregoing embodiments.

For the control instruction, refer to the control instruction mentioned in the embodiment in FIG. 8.

For an example implementation of the first operating state, refer to the off state of the smart lamp shown in FIG. 7b in the real scenario.

An example implementation of the simulated operating state may include a simulated operating state when the smart lamp is turned off in the area 402 on the user interface 40 shown in FIG. 7b.

In some embodiments, the electronic device may prompt the user that the binding relationship has been successfully established between the associated user of the electronic device and the smart home device. For a prompt manner, refer to related descriptions in the foregoing embodiments. For example, the electronic device may display the first user interface and the second user interface in different background colors.

According to the device control page display method shown in FIG. 12, an embodiment of this application further provides an electronic device. The electronic device may include one or more processors, a memory, and a display. The memory is coupled to the one or more processors, the memory is configured to store computer program code, the computer program code includes computer instructions, and the one or more processors invoke the computer instructions, so that the electronic device performs the following operations:

displaying a first user interface on the display, where the first user interface includes a first control for controlling a smart home device and a status display area of the smart home device;

in response to an operation of selecting the first control, displaying a simulated operating state of the smart home device in the status display area;

receiving an association success notification, where the association success notification indicates that a binding relationship is successfully established between an associated user of the electronic device and the smart home device;

displaying a second user interface on the display, where the second user interface includes a second control for controlling a smart home device and a status display area of the smart home device; and in response to an operation of selecting the second control, sending a control instruction to the smart home device, where the control instruction instructs the smart home device to enter a first operating state according to the operation of selecting the second control; and displaying a simulated operating state of the smart home device in the status display area of the second user interface, where the simulated operating state displayed in the status display area of the second user interface corresponds to the first operating state.

Herein, for an operation that the one or more processors invokes the computer instructions to enable the electronic device to perform, refer to step S101 to step S105 in the method shown in FIG. 12. For details, refer to related descriptions in the embodiment in FIG. 12.

Herein, the electronic device may be the electronic device 100 shown in FIG. 2, the processor may be the processor 100 in the electronic device 100 shown in FIG. 2, the memory may be the internal memory 121 in the electronic device 100 shown in FIG. 2, and the display may be the display 194 in the electronic device 100 shown in FIG. 2.

According to the method provided in one or more embodiments of the present disclosure, after the electronic device discovers the nearby smart home device and before the user establishes a dependency relationship with the smart home device, the electronic device may provide the control page of the smart home device. In other words, the user may view the control page of the smart home device that is provided by the electronic device without waiting for a dependency relationship to be successfully established with the smart home device. The user can be familiar with a control method of the smart home device and learn of various functions of the smart home device in advance by using the control page. This better conforms to user habits and improves user experience.

The implementations of this application may be randomly combined to achieve different technical effects.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In short, the descriptions are embodiments of the technical solutions of the present disclosure, but are not intended to limit the protection scope of the present disclosure. Any modification, equivalent replacement, or improvement made according to the disclosure of the present disclosure shall fall within the protection scope of the present disclosure.

What is claimed is:

1. A method, comprising:
    displaying, by an electronic device, a first user interface, wherein the first user interface comprises a first control for controlling a smart home device and a status display area of the smart home device;
    displaying a first simulated operating state of the smart home device in the status display area in response to selecting the first control;
    receiving, by the electronic device, an association success notification, wherein the association success notification indicates that a binding relationship is successfully established between an associated user of the electronic device and the smart home device;
    displaying, by the electronic device, a second user interface, wherein the second user interface comprises a second control for controlling the smart home device and the status display area of the smart home device; and
    sending a control instruction to the smart home device in response to selecting the second control, wherein the control instruction instructs the smart home device to enter a first operating state according to the selecting the second control; and displaying a second simulated operating state of the smart home device in the status display area of the second user interface, wherein the second simulated operating state displayed in the status display area of the second user interface corresponds to the first operating state;
    wherein after the receiving, by the electronic device, the association success notification, and before the displaying the second user interface, the method further comprises:
        displaying, by the electronic device, a third user interface, wherein the third user interface comprises a first application scenario option; and
        setting, by the electronic device, an application scenario of the smart home device to a first scenario corresponding to the first application scenario option in response to a detected operation performed on the first application scenario option.

2. The method according to claim 1, wherein before the displaying, by the electronic device, the first user interface, the method further comprises:
    obtaining, by the electronic device, an index number of the smart home device,
    wherein the index number of the smart home device indicates at least a category of the smart home device, a manufacturer of the smart home device or a model of the smart home device, and
    the first user interface and the second user interface correspond to the index number of the smart home device.

3. The method according to claim 1, wherein the electronic device fails to send a control instruction to the smart home device in response to the selecting the first control.

4. The method according to claim 1, wherein the first control and the second control adjust at least a working state of the smart home device or a working parameter of the smart home device.

5. The method according to claim 1, wherein the status display area comprises an image of the smart home device that is captured by a camera of the electronic device, or a default image of the smart home device.

6. The method according to claim 5, wherein the camera captures the image of the smart home device, and the status display area includes the image of the smart home device; and
the displaying the simulated operating state of the smart home device in the status display area comprises:
superimposing a simulated effect on the image of the smart home device for display, wherein the simulated effect reflects the simulated operating state of the smart home device.

7. The method according to claim 1, wherein background colors of the first user interface and the second user interface are different.

8. The method according to claim 1, wherein the association success notification indicates that an associated user account of the electronic device and a first identifier of the smart home device are successfully associated.

9. A computer-readable storage medium comprising non-transitory instructions, wherein the electronic device is enabled to perform the method according to claim 1 in response to the non-transitory instructions being executed on the electronic device, the electronic device having a processor.

10. An electronic device, comprising one or more processors, a memory, and a display, wherein the memory is coupled to the one or more processors, the memory is configured to store non-transitory computer instructions, and the one or more processors execute the non-transitory computer instructions, thereby causing the electronic device to perform:
displaying a first user interface on the display, wherein the first user interface comprises a first control for controlling a smart home device and a status display area of the smart home device;
displaying a first simulated operating state of the smart home device in the status display area in response to selecting the first control;
receiving an association success notification, wherein the association success notification indicates that a binding relationship is successfully established between an associated user of the electronic device and the smart home device;
displaying a second user interface on the display, wherein the second user interface comprises a second control for controlling the smart home device and the status display area of the smart home device; and
sending a control instruction to the smart home device in response to selecting the second control, wherein the control instruction instructs the smart home device to enter a first operating state according to the selecting the second control; and displaying a second simulated operating state of the smart home device in the status display area of the second user interface, wherein the second simulated operating state displayed in the status display area of the second user interface corresponds to the first operating state;
wherein
after the receiving the association success notification, and before the displaying the second user interface, displaying a third user interface, wherein the third user interface comprises a first application scenario option; and
setting an application scenario of the smart home device to a first scenario corresponding to the first application scenario option in response to a detected operation performed on the first application scenario option.

11. The electronic device according to claim 10, wherein the one or more processors are further configured to execute the non-transitory computer instructions, thereby causing the electronic device to further perform:
before displaying the first user interface on the display, obtaining an index number of the smart home device, wherein the index number of the smart home device is used to indicate one or any combination of a category, a manufacturer, or a model of the smart home device, and the first user interface and the second user interface correspond to the index number of the smart home device.

12. The electronic device according to claim 10, wherein the one or more processors are further configured to execute the non-transitory computer instructions, thereby causing the electronic device to further perform:
failing to send a control instruction to the smart home device in response to the selecting the first control.

13. The electronic device according to claim 10, wherein the first control and the second control adjust at least a working state of the smart home device or a working parameter of the smart home device.

14. The electronic device according to claim 10, wherein the status display area comprises an image of the smart home device that is captured by a camera of the electronic device, or a default image of the smart home device.

15. The electronic device according to claim 14, wherein the camera captures the image of the smart home device, and the status display area includes the image of the smart home device; and
the displaying the simulated operating state of the smart home device in the status display area comprises:
superimposing a simulated effect on the image of the smart home device for display, wherein the simulated effect reflects the simulated operating state of the smart home device.

16. The electronic device according to claim 10, wherein background colors of the first user interface and the second user interface are different.

17. The electronic device according to claim 10, wherein the association success notification indicates that an associated user account of the electronic device and a first identifier of the smart home device are successfully associated.

* * * * *